(12) United States Patent
Holmes

(10) Patent No.: US 11,654,710 B2
(45) Date of Patent: May 23, 2023

(54) SECURITY ELEMENTS AND METHODS OF MANUFACTURE THEREOF

(71) Applicant: DE LA RUE INTERNATIONAL LIMITED, Basingstoke (GB)

(72) Inventor: Brian Holmes, Basingstoke (GB)

(73) Assignee: DE LA RUE INTERNATIONAL LIMITED, Hampshire (GB)

(*) Notice: Subject to any disclaimer, the term of this patent is extended or adjusted under 35 U.S.C. 154(b) by 149 days.

(21) Appl. No.: 17/040,393

(22) PCT Filed: Mar. 22, 2019

(86) PCT No.: PCT/GB2019/050828
§ 371 (c)(1),
(2) Date: Sep. 22, 2020

(87) PCT Pub. No.: WO2019/180459
PCT Pub. Date: Sep. 26, 2019

(65) Prior Publication Data
US 2021/0053380 A1 Feb. 25, 2021

(30) Foreign Application Priority Data
Mar. 22, 2018 (GB) ..................... 1804629

(51) Int. Cl.
*B42D 25/324* (2014.01)
*B42D 25/328* (2014.01)
(Continued)

(52) U.S. Cl.
CPC ......... *B42D 25/328* (2014.10); *B42D 25/324* (2014.10); *B42D 25/45* (2014.10);
(Continued)

(58) Field of Classification Search
CPC .................. B42D 25/324; B42D 25/328
See application file for complete search history.

(56) References Cited

U.S. PATENT DOCUMENTS

2005/0040643 A1* 2/2005 Mancuso ................ B41M 1/14
283/114
2007/0024975 A1* 2/2007 McGrew ............ G02B 27/4233
359/569
(Continued)

FOREIGN PATENT DOCUMENTS

AU 2012100985 A4 * 7/2012 ............ B41M 3/14
DE 10157534 C1 * 5/2003 ............ B42D 25/29
(Continued)

OTHER PUBLICATIONS

Jul. 3, 2019 International Search Report issued in International Patent Application No. PCT/GB2019/050828.

*Primary Examiner* — Kyle R Grabowski
(74) *Attorney, Agent, or Firm* — Oliff PLC

(57) ABSTRACT

A security element including: a first layer having a first surface; an array of image regions across the surface, each region including at least first and second sub-regions; a first diffractive optically variable effect generating structure in or on the surface across the first sub-regions; and a second diffractive optically variable effect generating structure in or on the surface across the second sub-regions; wherein the surface is arranged so each first sub-region has a first average inclination and each second sub-region has a second average inclination different from the first, wherein the first structure and inclination provide that the first effect is exhibited across the first sub-regions at least at a first viewing angle and the second structure and inclination provide that the second effect is exhibited across the second sub-regions at least at a second viewing angle different from the first. Also, a method of manufacturing the security element.

16 Claims, 25 Drawing Sheets

(51) Int. Cl.
  *B42D 25/45* (2014.01)
  *G02B 5/18* (2006.01)
  *B42D 25/23* (2014.01)
  *B42D 25/24* (2014.01)
  *B42D 25/29* (2014.01)
  *B42D 25/373* (2014.01)

(52) U.S. Cl.
  CPC ......... *G02B 5/1819* (2013.01); *G02B 5/1847* (2013.01); *G02B 5/1857* (2013.01); *B42D 25/23* (2014.10); *B42D 25/24* (2014.10); *B42D 25/29* (2014.10); *B42D 25/373* (2014.10)

(56) References Cited

U.S. PATENT DOCUMENTS

2013/0093172 A1    4/2013   Fuhse et al.
2013/0163897 A1*   6/2013   Vizdal ..................... G03H 1/30
                                                        359/9
2020/0070564 A1*   3/2020   James ................ G02B 5/1809

FOREIGN PATENT DOCUMENTS

| | | | |
|---|---|---|---|
| DE | 10 2011 014114 B3 | 5/2012 | |
| EP | 0 059 056 A1 | 9/1982 | |
| EP | 0 860 298 A2 | 8/1998 | |
| EP | 1 469 325 A2 | 10/2004 | |
| EP | 1 893 416 B1 | 3/2009 | |
| EP | 2 676 802 A1 | 12/2013 | |
| EP | 1 888 349 B1 | 2/2014 | |
| EP | 2867031 B1 * | 8/2016 | ............. B42D 25/29 |
| EP | 3 184 318 A1 | 6/2017 | |
| GB | 2563905 A * | 1/2019 | ............. B42D 25/23 |
| JP | 2004-347828 A | 12/2004 | |
| JP | 2004347828 A * | 12/2004 | |
| JP | 2007-223100 A | 9/2007 | |
| JP | 2009-265563 A | 11/2009 | |
| JP | 5351412 B2 | 11/2013 | |
| JP | 2015-132721 A | 7/2015 | |
| WO | 83/00659 A1 | 3/1983 | |
| WO | 00/39391 A1 | 7/2000 | |
| WO | 03/054297 A2 | 7/2003 | |
| WO | 03/095188 A2 | 11/2003 | |
| WO | WO-2019077316 A1 * | 4/2019 | ......... B23K 26/0624 |

* cited by examiner

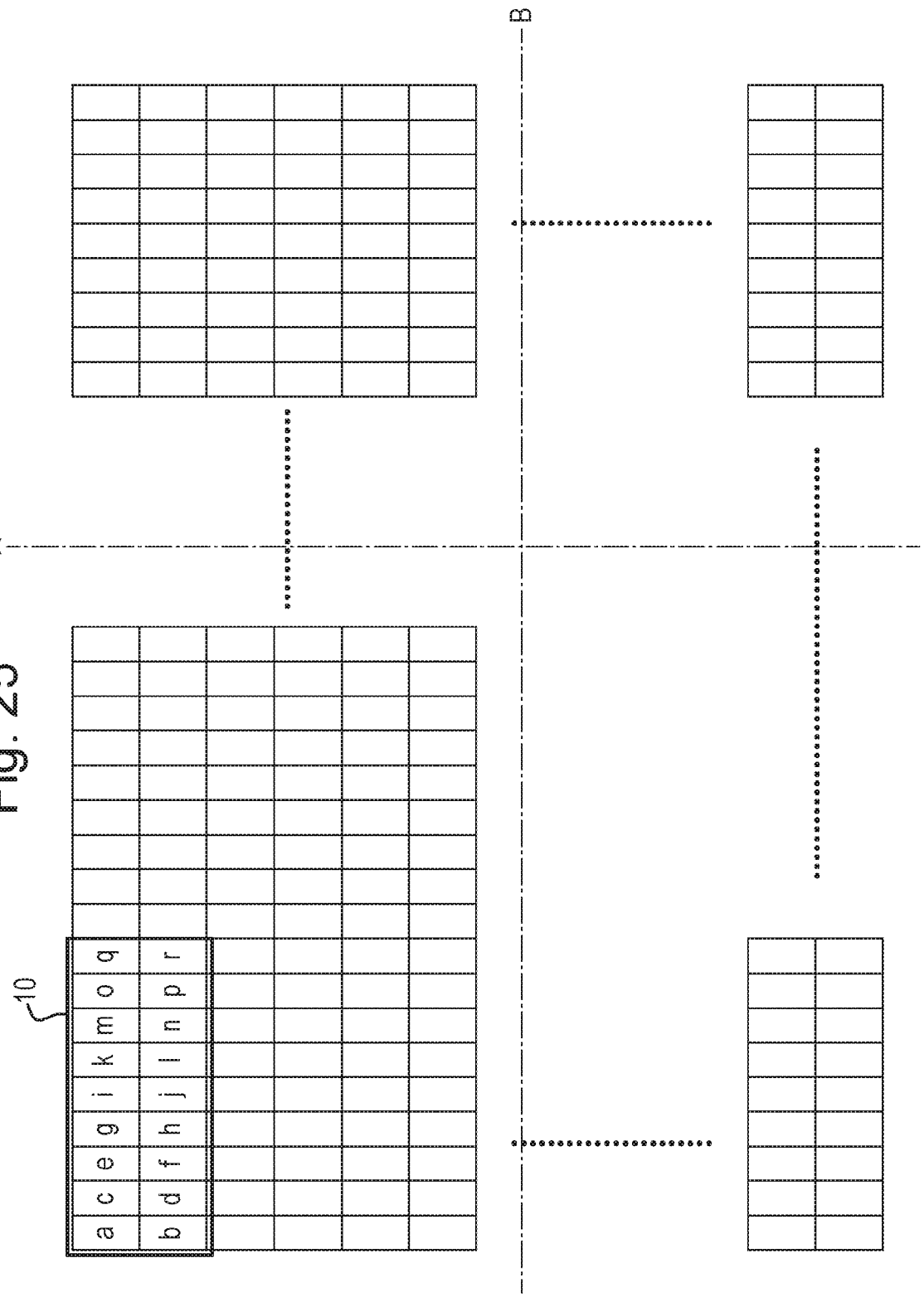

SECURITY ELEMENTS AND METHODS OF MANUFACTURE THEREOF

FIELD OF THE INVENTION

The present invention relates to security elements such as those suitable for use in or on security documents such as banknotes, identity documents, passports, certificates and the like, as well as methods for manufacturing such security elements.

DESCRIPTION OF THE RELATED ART

To prevent counterfeiting and enable authenticity to be checked, security documents are typically provided with one or more security elements which are difficult or impossible to replicate accurately with commonly available means, particularly photocopiers, scanners or commercial printers.

Many conventional security elements utilise diffractive optically variable effect generating relief structures, such as diffraction gratings, to provide an optically variable effect, i.e. an appearance that changes upon tilting or rotation of the device, which cannot be replicated by copying, as with a photocopier or scanner or by printing techniques. A problem with security elements that utilise first order diffraction gratings with spatial periods of 0.7 micrometres or more is that the clarity of the optically variable effect is sensitive to illumination conditions. One aspect of this sensitivity is that as we move away from idealised collimated or point source lighting, the chromatic quality and differentiation generated by the arrangement of grating structures and typically visualised by tilting of the device about an east-west axis is progressively degraded by increasing light source diffusion or angular subtense. To the extent that under highly diffuse light illumination the colour contrast or difference between image design or artwork elements becomes reduced to a level that can affect visual recognition and authentication. Another aspect of light source dependence, relates to graphical animation effects as well as parallax effects, which are primarily controlled by variations in grating orientation and are ideally visualised as a progressive or contiguous effect on tilting of the device about a north-south axis or rotation about the device normal. However under diffuse, extended or multiple light sources multiple or substantial parts of the animation or 3D parallax effect are visualised simultaneously to the extent that the verifiable optically variable effect loses clarity or definition. The effect of these 2 aspects of light source dependence is to create light source situations where the optical variable effect in conventional diffractive optically variable devices is ambiguous or weakly expressed. Diffractive devices based on more specialised diffractive grating structures, specifically with periodicities similar to or less than the mean visible wavelength of white light but operating in the first order of diffraction or alternatively with periodicities similar to or less than the wavelengths in the deep blue part of the visible spectrum and operating in the zeroth order diffraction may have fairly narrow or restricted range of viewing angles which are not ergonomic to the viewer or observer. For example the former may only be visible when viewed obliquely (following tilting about the east-west device axis), whereas the latter will be viewable along the direction of geometrical reflection and be therefore competing with any reflective glare from the surface of the device.

It is therefore desirable to provide a security element which overcomes some of the problems associated with conventional diffractive-based security elements and provides for greater control over the replay conditions of diffractive optically variable effect generating relief structures.

SUMMARY OF THE INVENTION

According to a first aspect of the present invention, there is provided a security element comprising: a first layer having a first surface; an array of image regions across the first surface, each image region comprising at least a first sub-region and a second sub-region; a first diffractive optically variable effect generating structure, typically a diffractive optically variable effect generating relief structure, provided in or on the first surface across the first sub-regions; and a second diffractive optically variable effect generating structure, again typically a relief structure, provided in or on the first surface across the second sub-regions; wherein the first surface is arranged such that each first sub-region has a first average inclination and such that each second sub-region has a second average inclination different from the first average inclination, wherein the first diffractive optically variable effect generating structure and the first average inclination provide that the first optically variable effect is exhibited across the first sub-regions at least at a first viewing angle and the second diffractive optically variable effect generating structure and the second average inclination provide that the second optically variable effect is exhibited across the second sub-regions at least at a second viewing angle different from the first viewing angle.

The security element of the present invention provides first and second diffractive optically variable effect generating structures, typically structures that are different from one another (e.g. arranged in different patterns), across arrays of corresponding first and second sub-regions with respective inclinations. By providing diffractive optically variable effect generating structures at different inclinations, the angle of incidence of light is effectively altered between the first and second sub-regions. This allows for improved control over the diffractive replay of the structures included in the security element at the respective different inclinations. For example, the increase in the number of effective angles of incidence can provide an alternative to varying other parameters, such as orientation, for providing optical variability in a second direction, can increase the number of viable viewing angles which satisfy the replay criteria for zero order and other nano-grating structures and can improve the clarity of devices viewed in diffuse lighting conditions. More detailed examples of these effects will be discussed below.

A diffractive optically variable effect generating structure will be understood to be any structure that has an appearance that varies owing to diffraction as the angle of regard changes for a fixed incidence angle or vice versa. Examples of optically variable effects include, in particular, structures which exhibit different diffractive effects upon tilting, e.g. a colour change, as well as structures which exhibit a diffractive effect only at certain viewing angles, i.e. effects which appear to "switch off" as the device is tilted away from a specific viewing angle or viewing angle range. In many cases, optically variable effects will exhibit both a changing diffractive effect and viewing angles at which substantially no diffractive effect is visible.

The diffractive optically variable effect generating relief structures are provided in corresponding first and second sub-regions of an array of image regions. The term image region in the present context refers to an area of the element that will generate a corresponding portion of the appearance of, e.g. an image displayed by, the security element. Each image region comprises at least a first sub-region, which provides the means for exhibiting the corresponding portion of a first image, and a second sub-region, which will likewise provide the means for exhibiting the corresponding portion of the second image. For example one image region may be designated as the top "slice" of an image displayed by the security element. In which case, at least at one particular viewing angle, the first sub-region within said image region may exhibit a diffractive effect that provides the top "slice" of this first image. At a second viewing angle, a second image may be displayed, in which case the top "slice" of this second image may again be originated in said top image region, but this time from a second sub-region. The surface of the first layer is provided with an array of image regions such that both the first and second diffractive optically variable effect generating relief structures will exhibit their effects across a similar region of security element. These first and second sub-regions of the image regions have respective average inclinations. An average inclination of a sub-region is considered to be the angle of a plane that approximates the sub-region. In some cases, the sub-regions will in fact be substantially planar, however, in other cases, the sub-regions may be shaped, for example, convex. In any case, the average inclination provides for an approximation of how light will interact with that sub-region of the surface and providing the sub-regions with different average inclinations will ensure that these regions control incident light differently.

The collective appearance of the first sub-regions and the collective appearance of the second sub-regions will be determined both by the inclinations of those sub-regions and the respective diffractive optically variable effect generating relief structure used. In particular, the manner in which a diffractive optically variable effect generating relief structure replays at a particular viewing angle is a function of the angle of incidence of light, which is controlled by the inclination of the surface, as well as the characteristics of the diffractive structure such as the orientation, pitch and profile of the structure. Accordingly, the sub-regions may be constructed to achieve complex and visually striking effects in which the second optically variable effect is exhibited across the second sub-regions at least at a second viewing angle different from the first viewing angle, at which the first optically variable effect is displayed. It will be appreciated that at the first viewing angle, the second optically variable effect will substantially not be exhibited and, at the second viewing angle, the first optically variable effect will substantially not be exhibited. In practice, the first and second optically variable effects will typically be visible over respective only partially or non-overlapping viewing angle ranges, as will be discussed below. However, some structures, such as zero order structures, may exhibit their effects at substantially only one viewing angle.

In many cases, the first surface will be a reflective first surface to improve the efficiency of the diffractive structures. A reflective surface may be considered one that reflects more than 30%, preferably more than 50%, more preferably more than 70% of incident light. Alternatively, or in addition, the first surface may be coated in a substantially opaque reflector layer that increases the efficiency of the diffractive structures. What is important is that, for diffractive relief structures, a reflective material follows the diffractive relief in order to increase the reflectivity and hence the efficiency of the diffractive relief structure.

As mentioned, a particularly preferable class of diffractive structures are diffractive relief structures and so preferably the first and second diffractive optically variable effect generating structures are diffractive relief structures. While, preferable, in principle any diffractive structure could be utilised.

Preferably, the array of image regions comprises a regular array of image regions. Preferably the image regions are substantially the same shape and have substantially the same size on the first surface as one another and are equally spaced from one another. This is preferable to give the device an even appearance, however in alternative embodiments the image regions could be arranged in an irregular manner and/or have different shapes or sizes. Further preferably, the image regions or at least the sub-regions themselves have a narrowest dimension on a scale not discernible to the naked eye. For example, preferably the image regions or the sub-regions have a width of less than 200 microns along the repeat direction, preferably less than 100 microns, preferably less than 50 microns, preferably less than 20 microns.

Similarly, preferably the first and second sub-regions are regularly arranged across the array of image regions. That is, each image region may be identical in its layout of the sub-regions. However, this is not essential and in some embodiments, the layout of the sub-regions may differ from one image region to the next, provided they are given their required average inclinations so that one sub-region from each image region cooperates at the appropriate viewing angles.

In some embodiments, the first surface is arranged such that, at least at the first viewing angle, each first sub-region obscures from view each corresponding second sub-region. This provides one means by which the different optical effects may be visible separately at certain viewing angles. Similarly, in some embodiments, the first surface is arranged such that, at least at the second viewing angle, each second sub-region obscures from view each corresponding first sub-region. In these embodiments, the first surface may be arranged to achieve the obscuring function by providing that the inclinations of the first and/or second sub-regions is great enough relative to the plane of the security element to block the corresponding sub-region from view over a significant viewing angle range. The geometry of the first surface will be freely configurable to achieve the obscuring over the desired range of viewing angles. This provides for very distinct effects in which diffuse ambient light cannot introduce noise or visual "cross-talk" from multiple diffractive structures. However, this is not essential to achieving effects that are displayed at different viewing angles from one another. As has been mentioned, the combination of the inclination and the characteristics of the diffractive structures also provide means for separating the diffractive effects.

In most cases, the first diffractive optically variable effect generating relief structure and the first average inclination provide that the first optically variable effect is exhibited across the first sub-regions over a first range of viewing angles, and the second diffractive optically variable effect generating relief structure and the second average inclination provide that the second optically variable effect is exhibited across the second sub-regions over a second range of viewing angles different from the first range of viewing angles. These viewing angle ranges may overlap such that, at some viewing angles, both effects are visible simultaneously, or may be entirely non-overlapping. This will be freely configurable by controlling the inclinations of the first and second sub-regions in conjunction with the parameters of the diffractive structures.

While it is possible that the first diffractive structure could be provided uniformly across the entirety of their respective sub-regions such that the first sub-regions each have the same uniform appearance at any particular viewing angle, preferably the first diffractive optically variable effect generating structure is provided in or on the first surface across the first sub-regions such that a first image is displayed by the first sub-regions in combination at least at the first viewing angle. That is, preferably, the first diffractive optically variable effect generating structure is provided across the first sub-regions and spatially arranged and/or modulated across the first sub-regions in accordance with a first image such that the first image is displayed by the first sub-regions in combination at least at the first viewing angle. For example, the first diffractive optically variable effect generating structure may be provided in a non-continuous manner across the first sub-regions, e.g. provided non-continuously within the various first sub-regions, so that the first sub-regions together define an image. That is, the first diffractive optically variable effect generating structure may be provided in select regions in order to build up an image against an empty background. Alternatively, the first diffractive optically variable effect generating relief structure may be modulated across the first sub-region in accordance with image information. That is, the first and/or second optically variable effect generating structure may vary in one or more of its pitch, orientation and size, shape and/or profile of the elements of the structure across the corresponding first and/or second sub-regions in accordance with image information of corresponding first and/or second images. For example, it is particularly preferable for the pitch to be varied in order to introduce colour variation of the first and/or second images.

Similarly, the second diffractive optically variable effect generating relief structure may be provided in or on the first surface across the second sub-regions such that a second image is displayed by the second sub-regions in combination at least at the second viewing angle. That is, preferably, the second diffractive optically variable effect generating structure is provided across the second sub-regions and spatially arranged and/or modulated across the second sub-regions in accordance with a second image such that the second image is displayed by the second sub-regions in combination at least at the second viewing angle. The second diffractive optically variable effect generating relief structure may be provided in a non-continuous manner or modulated in the same manner described above with respect to the first diffractive optically variable effect generating relief structure. The second image need not bear any relation to the first image although in some embodiments the images may cooperate or be conceptually linked. For example, where the viewing angle ranges overlap, the first and second image may combine to form a complete image, or where the viewing angle ranges do not overlap, the images may simulate animation of an image.

Various effects may be achieved using the present structure for displaying different images at different viewing angles. For example, the sub-regions and corresponding diffractive structures may present a series of different images to a viewer so that an animation or image switch is visible upon tilting the device to cycle through the images displayed by those corresponding sub-regions. As will be described in more detail below, more than two sub-regions per image region may be used to increase the number of different images that may be displayed at respective different viewing angles. Where image switches or animations are provided, further images can increase the complexity of the image switch or provide a smoother animation with more frames. As an alternative to animations and image switches, the different images presented by the different sub-regions and corresponding diffractive structures may each be a different perspective of the same object and the views may be configured such that rotation of the security element gives the impression of a rotation of the object depicted in the images, and preferably it gives the impression of a corresponding rotation of the object depicted in the images. For example, if a rotation of 5° is required to switch from the first image to the second image, the first and second images may present different perspectives of the same object 5° apart. Again, it will be appreciated that more than two sub-regions may be used to provide more than two images and so increase the number of different views of the same object in such embodiments. As described elsewhere in this description, the form of the images may be freely configured, e.g. by modulating or arranging the diffractive structure across the corresponding sub-regions. Similarly, the viewing angles at which these images appear may be controlled by the average inclination of the sub-region in combination with the parameters of the corresponding diffractive structures.

While the orientations of the diffractive structures may often be the same, in some preferable embodiments, the first diffractive optically variable effect generating structure is provided in or on the first surface across the first sub-regions with a characteristic first orientation and the second diffractive optically variable effect generating structure is provided in or on the first surface across the second sub-regions with a characteristic second orientation different from the first orientation. By having the sub-regions differ both in inclination and orientation, it is possible to separate the diffractive effects to a greater degree than has been achieved in conventional devices which have diffractive structures differing in orientation in the same plane. Orientation is a particularly preferable means for controlling, together with inclination, the viewing angle at which the optically variable effects are visible. This is because diffractive effects are typically visible in a plane substantially perpendicular to the diffractive elements of the diffractive structure (e.g. perpendicular to grating elements of a diffraction grating) and so varying orientation provides that these planes are differently arranged for different diffractive structures. Meanwhile, these structures may be varied by one or more of the remaining parameters, pitch, and size, shape and/or profile of the elements of the structure, to introduce respective image information, i.e. by modulation.

In some particularly preferable embodiments, the second image is a perspective-altered version of the first image and preferably the first and second viewing angles are configured such that a stereoscopic image is displayed to a viewer. As has been mentioned above, the inclination of the respective sets of sub-regions, as well as the characteristics of the diffractive relief structures, may be controlled to configure the viewing angles for the first and second images. By appropriately configuring the viewing angle ranges, each eye of a viewer may be presented with an image from the first and second sets of sub-regions respectively, such that a stereoscopic image is displayed. Alternatively, a number of sub-regions and corresponding diffractive structures may present a series of images to a viewer so that an animation is visible upon tilting the device to cycle through the images displayed by those corresponding sub-regions.

In many embodiments, the array of image regions comprises a one-dimensional array of image regions. For example, the array of image regions may comprise an array of elongate image regions, each elongate image region extending in a first direction along the first surface, the array of elongate image regions being arranged along a second direction along the first surface substantially perpendicular to the first direction along the first surface. Typically, each elongate image region is divided lengthwise into at least the first and second sub-regions. Here, the first and second sub-regions are essentially interlaced in one direction (the second direction). When the element is viewed at an angle at which, for example, the first diffractive relief structure replays, each of these interlaced first sub-regions will contribute to the appearance of the element. Where the sub-regions are on a scale not discernible by the human eye, this will appear to the viewer as if the security element is replaying across the whole of the security element, even if the second diffractive structure in the second sub-regions is not replaying. Such embodiments may be used to replicate so-called one-dimensional lenticular security elements. That is, the first sub-regions, when viewed at angles at which they exhibit a diffractive effect, may combine to provide the element with a first appearance and the second sub-regions, when viewed at angles at which they exhibit a diffractive effect, may combine to provide the element with a second appearance.

The above has focussed on cases in which each image region is divided into first and second sub-regions, but it will be appreciated that each image region can be divided into any number of sub-regions, depending on the desired characteristics of the final security element and, in particular, the number of desired different images. In such cases, each set of sub-regions may have their own average inclination for controlling the appearance of the device. For example, in some embodiments comprising elongate image regions, each elongate image region is divided, preferably lengthwise, into at least the first sub-region, the second sub-region and a third sub-region, wherein a third diffractive optically variable effect generating structure is provided in or on the first surface across the third sub-regions and wherein the first surface is arranged such that each third sub-region has a third average inclination different from the first and second average inclinations, and wherein the third diffractive optically variable effect generating structure and the third average inclination provide that the third optically variable effect is exhibited across the third sub-regions at least at a third viewing angle different from the first and second viewing angles. The third sub-regions at the third inclination effectively provide a further independent image channel. All of the preferable configurations of the first and second diffractive optically variable effect generating structures described herein may be applied equally to any third or subsequent sub-regions. For example, the third diffractive structure may be modulated and/or spatially arranged in accordance with a third image. Further sub-regions can be introduced as desired. For example, where the device is configured to exhibit an animation, more sub-regions may be preferable to provide additional frames to the animation.

In embodiments comprising elongate image regions, preferably, the first surface is arranged such that the first and second optically variable effects are exhibited at different viewing angles in a direction of rotation of the security element about the first direction. This may be achieved by providing that the first average inclination differs from the second average inclination about an image region axis parallel with the first direction along the first surface. That is, the first surface will typically vary in height along the second direction across the first surface, but be invariable along the first direction. This provides that light incident on the first surface is reflected by the first and second sub-regions in directions that are offset along the second direction. This difference introduced by the arrangement of the first surface helps to control the replay angles for the first and second diffractive optically variable effect generating structures. In particularly preferable embodiments, a cross-section along the second direction of each first and/or second sub-region is substantially constant along the first direction. In other words, preferably the surface varies primarily along the second direction and is substantially invariant along the first direction. This provides that the first surface only alters the angle of incidence of light with respect to the second direction.

In particular where the sub-regions differ from one another in their inclination about a single direction, such as elongate image regions divided lengthwise into a number of sub-regions as described above, the security element may be configured for one of two fundamental viewing arrangements. In a first viewing arrangement, the security element is held such that the sub-regions act to direct light in different lateral directions, e.g. with the elongate image regions extending substantially vertically. For this viewing arrangement, preferably the diffractive optically variable effect generating structures comprise diffractive elements that extend at least 45° from the direction of the image region axis, i.e. the horizontal direction, and preferably at least 70° from and most preferably perpendicular to the horizontal. Such an arrangement ensures that the diffractive optically variable effect generating structures provide strong optical variability as the security element is rotated about the horizontal axis. The other fundamental viewing arrangement is where the security element is held such that the sub-regions act to direct light in different vertical directions, e.g. with the elongate image regions, and the image region axis about which the inclinations are defined, extending substantially horizontally. For this viewing arrangement, preferably the diffractive optically variable effect generating structures comprise diffractive elements that extend within 45° of the direction of the direction of the image region axis, preferably within 20° and most preferably aligned with the direction of the image region axis. Again, this ensures strong optical variability resulting from a diffractive dispersion effect when the device is rotated about the horizontal axis. As opposed with the previous viewing configuration, here the optical variability of the diffractive structures combines with the effect of the varying inclination of the sub-regions to produce complex effects. In both of these two viewing arrangements, the orientations of the diffractive structures need not be the same, and as described above it can be preferable to provide different orientations to either separate the diffractive effects or to provide optical variability in two orthogonal directions of tilt, but the orientations of the structures are preferably both selected within the ranges defined above for the corresponding viewing arrangement.

Preferably, at least the first and/or second diffractive optically variable effect generating structure has a pitch, orientation and size, shape and/or profile of the elements of the relief structure configured such that the first and/or second diffractive optically variable effect generating structure exhibits optical variability upon rotation of the security element about the second direction. The optical variability will typically be a diffractive effect that changes, e.g. a colour change, upon rotation of the security element about the second direction. These embodiments are particularly advantageous, as the diffractive optically variable effect generating structures can be used to provide optical variability in one direction of tilt, while the arrangement of the first surface can be used to switch between the different diffractive optically variable effect generating structures, thereby providing optical variability in an orthogonal direction of tilt. For example, where the orientation of the diffractive structures (e.g. diffraction grating) are such that the diffractive elements extend generally along or close to the second direction (as seen in a plan view of the first surface), a diffractive effect will typically be exhibited upon rotation about the second direction. To ensure strong optical variability upon rotation of the security element about the second direction, the first and/or second diffractive optically variable effect generating structure should include diffractive elements that extend along a direction within 45° of the plane perpendicular to the first direction.

In some embodiments, the first diffractive structure may be arranged in discrete areas with characteristically different parameters to provide clear contrast between these different areas. In particularly preferable embodiments, the first sub-regions comprise an array of primary areas and an array of secondary areas, wherein the first diffractive optically variable effect generating structure comprises a primary diffractive optically variable effect generating structure (typically a relief structure) provided across the primary areas and a secondary diffractive optically variable effect generating structure (again, typically a relief structure) provided across the secondary areas, and wherein the primary diffractive optically variable effect generating structure differs from the secondary diffractive optically variable effect generating structure in at least one of the pitch of the structure, the orientation of the structure and the size, shape and/or profile of the elements of the structure such that the primary and secondary areas appear different at least at the first viewing angle. In these embodiments, the first diffractive optically variable effect generating structure is provided with two discrete components that introduce a variation in appearance across the first sub-regions. In some embodiments, the primary diffractive optically variable effect generating structure differs from the secondary diffractive optically variable effect generating relief structure in at least one of the pitch of the structure, the orientation of the structure and the size, shape and/or profile of the elements of the structure such that the primary and secondary areas vary differently in their appearance as the security element is rotated about the second direction. For example, the structures may vary in pitch such that the primary and secondary regions replay an optically variable effect over substantially the same angle ranges, but appear different colours at any one viewing angle within those ranges. The various diffractive structure criteria may be adjusted to control the precise manner in which these two effects vary depending on the desired final appearance of the security element.

In some embodiments, the primary and secondary areas may be spatially arranged across the first sub-regions in accordance with image information of a first image. That is, each first sub-region may effectively correspond to a slice of an image to be displayed, and the primary and secondary areas may define different parts of each image slice. For example, the primary areas across the image slices, i.e. across the first sub-regions, may define the shape of an icon, such as an alphanumeric character, while the secondary areas define a background to the icon. In some cases each first sub-region may comprise an array of primary areas and an array of secondary areas, the primary and secondary areas being interlaced along the first direction and each primary and secondary area having substantially the same first inclination. These interlaced primary and secondary areas may provide one way of building up a final image. For example, the primary and secondary relief structures may be distributed across only some of the primary and secondary areas depending on image information of a final image. Where the primary and secondary areas are interlaced in this manner, preferably they have a width in the interlace direction that is not discernible to the naked eye, e.g. preferably they have a width of less than 200 microns along the interlace direction, preferably less than 100 microns, preferably less than 50 microns, preferably less than 20 microns.

Preferably, the primary diffractive optically variable effect generating structure differs from the secondary diffractive optically variable effect generating structure in at least one of the pitch of the structure, the orientation of the structure and the size, shape and/or profile of the elements of the structure such that the primary diffractive optically variable effect generating structure exhibits a primary optically variable effect at least at a first viewing angle (preferably over a first viewing angle range) in a direction of rotation about the second direction and such that the secondary diffractive optically variable effect generating structure exhibits a secondary optically variable effect at least at a second viewing angle (preferably over a second viewing angle range), different from the first viewing angle, in a direction of rotation about the second direction. In many cases, the primary and secondary areas may be configured such that there is substantially no viewing angle range over which their respective optically variable effects are displayed at the same time. Here, the diffractive structure characteristics are configured to control the viewing angle at which the corresponding optically variable effects are visible. So, for example, the diffractive structure characteristics may provide that over a first viewing angle range in a direction of tilt about the second direction, the primary diffractive optically variable effect generating structure replays and over a second, different viewing angle range in a direction of tilt about the second direction, the secondary diffractive optically variable effect generating structure replays. This may provide that a primary image, built up by the primary diffractive structures in the primary areas, is displayed over the first viewing angle range in a direction of tilt about the second direction and a secondary image, built up by the secondary diffractive structures in the secondary areas, is displayed over the second viewing angle range in a direction of tilt about the second direction.

Preferably, the primary and secondary diffractive optically variable effect generating structures are respective diffraction gratings, and the grating elements of the diffraction gratings are oriented at an angle of at most 45° to the second direction (i.e. within 45° of a plane perpendicular to the first direction), preferably at most 20° to the second direction, more preferably at most 10° to the second direction. Since a diffraction grating typically replays a colour variation upon tilting about an axis parallel with its grating elements, the above arrangement provides that rotation of the security element about the second direction causes the diffractive replay of these gratings to be exhibited.

Alternatively, the primary and secondary diffractive optically variable effect generating structures may be respective diffraction gratings, wherein the grating elements of the diffraction gratings are oriented at an angle of at least 45° to the second direction, preferably at least 70° to the second direction, more preferably at least 80° to the second direction. This will typically provide that the diffractive effects of the primary and secondary diffractive optically variable effect generating relief structures are only exhibited over relatively narrow viewing angle ranges upon rotation of the security element about the second direction.

Preferably the primary and secondary diffractive optically variable effect generating relief structures differ at least in their orientation. Varying orientation is a preferred way of controlling the angles at which the relief structures replay as the security element is rotated about the second direction and allows the primary and secondary diffractive optically variable effect generating relief structures to independently visible at different viewing angles about the second direction, while the inclinations of the first and second sub-regions allow for control over which of the first and second sub-regions replays as the device is tilted about the first direction.

In some embodiments, the primary diffractive optically variable effect generating relief structure is provided across the primary areas of the first sub-regions in accordance with a first component of the first image and the secondary diffractive optically variable effect generating relief structure is provided across the secondary areas of the first sub-regions in accordance with a second component of the first image, and wherein the primary diffractive optically variable effect generating relief structure provides a first colour component of the first image at least at the first viewing angle and the secondary diffractive optically variable effect generating relief structure provides a second colour component of the first image at least at the first viewing angle. Here, the primary and secondary structures are used to provide different colour components of the same image. For example, the primary and secondary structures may differ in their pitch so that different wavelength, and hence different colours, of light are diffracted into a particular viewing direction. This may allow for a multi-coloured image that, for example, varies in colour upon rotation about the second direction. Again, the different sub-regions may, at the same time, provide for variability upon rotation about the first direction, thereby providing a security element which is optically variable in both orthogonal directions of tilt.

Alternatively, the primary diffractive optically variable effect generating structure may be provided across the primary areas in accordance with a primary image and the secondary diffractive optically variable effect generating structure provided across the secondary areas in accordance with a secondary image such that the primary and secondary images are visible at least at the first viewing angle in a direction of rotation about the second direction and at least at the second viewing angle in a direction of rotation about the second direction respectively. The structures should be selected so that at least one viewing angle is provided at which one structure exhibits its effect and the other does not, and vice versa. For example, the orientations of the structures may be different so that the primary and secondary structures exhibit their effects at different viewing angles.

Many of the above examples have been described in relation to one-dimensional arrays of sub-regions, but in some embodiments the array of image regions may comprise a two-dimensional array of image regions. In these cases, for example, each image region may act as a pixel in building up an overall image, that pixel being variable depending on viewing angle owing to different inclinations and different diffractive structures in corresponding sub-regions. Any two-dimensional layout of image regions may be used, but preferably the array of image regions are arranged along first and second orthogonal directions. The sub-regions of each image region may be arranged along at least one direction, preferably one of the first and second orthogonal directions. Further preferably the sub-regions are regularly arranged; however, again, this is not essential.

Preferably, each image region comprises a two-dimensional array of sub-regions, each sub-region being associated with a corresponding optically variable effect generating relief structure and each sub-region having a different average inclination, and wherein each optically variable effect generating structure and corresponding average inclination is configured such that each corresponding optically variable effect is visible across the image regions at a different viewing angle. That is, preferably each sub-region has its own respective at least one viewing angle at which its optically variable effect is exhibited while the other optically variable effects are substantially not visible. This may allow for the average inclinations to contribute to optical variability of the security element in both orthogonal directions of tilt by varying the incidence angle along two orthogonal directions. For example, in some embodiments the two-dimensional array of sub-regions may have corresponding diffractive optically variable effect generating structures and corresponding average inclinations configured such that the respective optically variable effects are visible at different viewing angles in directions of rotation of the security element about two orthogonal directions in the plane of the array of image regions. Here both the relief structure parameters and the inclinations of the sub-regions are adapted to produce the desired optical variability in two orthogonal directions.

Alternatively, the sub-regions of each image region may differ from one other in their average inclination about a direction (i.e. the same direction) parallel to an image region axis that is preferably along one of the first and second orthogonal directions. Here, the sub-regions have inclinations that control the effective angle of incidence to contribute to optical variability upon rotation of the security element about an axis parallel with the image region axis. For example, each respective diffractive optically variable effect generating structure may preferably be a diffraction grating and may have the same orientation that is perpendicular to said image region axis. Here, rotating the security element about an axis parallel with the image region axis will vary which sub-regions are exhibiting their effect in dependence upon the average inclination of said sub-regions. Where the sub-regions within each image region differ from one another in their inclination about a common direction, the same two fundamental viewing arrangements described above apply. That is the security element may be held such that the inclinations of the sub-regions act to direct light in different lateral directions, in which case preferably the diffractive optically variable effect generating structures comprise diffractive elements that extend at least 45° from the direction of the image region axis, i.e. the horizontal direction, and preferably at least 70° from and most preferably perpendicular to the horizontal, or the security element may be held such that the inclinations of sub-regions act to direct light in different vertical directions, in which case preferably the diffractive optically variable effect generating structures comprise diffractive elements that extend within 45° of the direction of the direction of the image region axis, preferably within 20° and most preferably aligned with the direction of the image region axis. These two arrangements provide the same advantages described above.

As has been mentioned above, the sub-regions may be provided by substantially planar facets. However, in some embodiments, the first and/or second sub-region, comprises a generally convex surface element. A convex surface element acts to direct light with a single incoming incidence angle over a cone of viewing angles and so can provide that the diffractive effect exhibited by the diffractive optically variable effect generating structure is visible over a wider viewing angle range. Preferably each image sub-region comprises a respective generally convex surface element. This may be provided by having each image region define a substantially continuous convex surface element, such as a hemi-cylindrical or hemi-spherical surface portion and dividing this continuous convex surface element into a plurality of regions that will act as the sub-regions described above. This may provide a smooth and/or continuous image change as the device is tilted along the convex direction, and so improve the replay characteristics of the device. In other words, in particularly preferable embodiments, the first surface is arranged so as to define a substantially convex surface element in each image region and each first sub-region is a first sub-region of a corresponding substantially convex surface element and each second sub-region is a second sub-region of a corresponding substantially convex surface element. A convex surface element may provide that the incidence angle varies gradually across the image region. Increasing the number of incidence angles can improve the replay characteristics of the security element. In particular, for zero order structures, which may replay only in the specular direction, a convex surface element may greatly increase the number of viewing angles at which the diffractive effect is visible. Similarly, for any nano-grating with a first order far removed from the zero order, the convex structure may increase the visibility of the diffractive effect. Preferably, the orientation of the diffractive optically variable effect generating structures will be such that the diffractive elements extend within 45° of, preferably within 20° of, preferably substantially along, a convex direction of the or each sub-region. This will act to increase the visibility of the diffractive effect in a direction perpendicular to the direction of diffractive dispersion. Where two-dimensional arrays of image regions are used, each substantially convex surface element may be convex in both orthogonal lateral directions. Preferably, each substantially convex surface element has a generally circular segment cross-section or a generally parabolic cross-section. In many cases, the substantially convex surface element in each image region defines substantially convex first and second sub-regions in each image region.

Convex sub-regions may be particularly preferably employed where the sub-regions exhibit image effects such as animations, image switches, or apparent rotation of an object, as described above. In particular, convex sub-regions may present a more continuous appearance of the effect across a range of viewing angles corresponding to the convex direction of the sub-regions.

While convex surface elements are preferred, other shapes may be used. For example prismatic-shaped surface elements with substantially planar facets may be used. In some such cases, each sub-region will comprise its own prismatic structure with a facet having a desired average inclination. Alternatively, each image region may define a multi-faceted prismatic surface structure element, with each facet acting as a respective sub-region. In other cases, the first surface may be arranged so as to define a diverging Fresnel mirror in each image region, and wherein each first sub-region is a first sub-region of a corresponding diverging Fresnel mirror and wherein each second sub-region is a second sub-region of a corresponding diverging Fresnel mirror. A diverging Fresnel mirror is essentially an arrangement of facets that substantially replicate the surface of a convex mirror, but eliminate the unnecessary thickness towards the centre of the mirror arrangement by providing each facet at substantially the same height. This structure operates on the same principle as Fresnel lenses, which are well known in the art. These structures have the advantage of reduced thickness compared with the convex structure they emulate. The facets of a so-called diverging Fresnel mirror may be convex to more accurately replicate a convex structure, or may each be substantially planar to approximate respective areas of the replicated convex structure.

Preferably, at least one of the first and second diffractive optically variable effect generating structures is a colour-generating diffractive structure. Further preferably, at least one of the first and second diffractive optically variable effect generating relief structures is a variable-colour-generating diffractive structure. A colour generating structure will typically modify incident white light by diffraction such that a viewer sees one or more colours when viewing the structure. A variable-colour-generating structure, e.g. a first order diffraction grating, modifies white light such that different colours are seen at different viewing angles. A conventional diffraction grating is an example of such a structure.

As has been mentioned, in some embodiments, at least one of the diffractive optically variable effect generating structures comprises a zero order diffractive structure, such as a zero order diffraction grating. Zero order diffractive structures typically exhibit practically no first or higher order diffractive effects and exhibit effects such as colour effects in the specular direction. In contrast, conventional dispersive structures will exhibit effects in all orders, including the zero order, but in most cases the effect in the zero order will not be visually striking, e.g. a dulling of reflection. By providing, for example, two different zero order structures across sub-regions with different inclinations, the effects can be made to replay at different viewing angles corresponding to their own specular direction. While many of the above embodiments are described with reference to the effects the inclinations have on the plane of diffractive dispersion, it will be appreciated that the various arrangements of the surface have similar effects on the direction of specular reflection due to the way the inclinations change the effective angle of incidence, and so the inclinations may be combined with zero order structures to take advantage of the increase in effective incidence angles.

The present invention applies in particular to zero order diffractive structures that exhibit rotational colour shift. Such zero order diffractive structures are produced by a rectangular relief structure (or binary relief structure) formed in a substantially transparent material, the relief structure being coated on the peaks and troughs (e.g. by a directional deposition technique) with a transparent high refractive index material (i.e. refractive index of 1.5 or more, preferably 2.0 or more), and further overcoated by a transparent material with an index which substantially matches that of the transparent material in which the rectangular relief structure is formed. The relief structure will typically have a pitch of between 100 nm and 500 nm, preferably between 200 nm and 400 nm, and a peak to trough height of between 200 nm and 600 nm, preferably between 300 nm and 500 nm, most preferably approximately 400 nm. The transparent high refractive index material, (such as ZnS) will typically be applied with a thickness of 50 nm to 200 nm, preferably 100 nm to 200 nm, preferably approximately 150 nm. The precise colour exhibited by the zero order diffractive structure will be determined by the grating depth to pitch ratio, the index difference between high and low material and the thickness of the high index lamella. Further details of such zero order diffractive structures may be found in "Optical Document Security", by Rudolf van Renesse, 3rd Edition, 2004, Chapter X. The extension of the invention to zero order diffractive structures that exhibit rotational colour shift provides for multiple different separately-visible rotational effects in dependence on the tilt angle of the security element, whereas conventional security elements, which included rotational zero order diffractive structures in a single plane, were limited to a single effective angle of incidence and so a single zero order effect. These types of zero order diffractive structures are particularly suited to use in embodiments that have sub-regions differ in average inclination in two orthogonal directions of tilt. For example, the array of image regions may comprises a two-dimensional array of image regions, wherein each image region is substantially convex along two orthogonal directions, and wherein each image region defines a two-dimensional array of convex sub-regions having different average inclinations, each set of sub-regions comprising a respective diffractive optically variable effect generating structure defining corresponding portions of a respective image, such that the different images are exhibited at different viewing angles in two orthogonal directions of tilt of the security element by the corresponding sub-regions in combination.

In some embodiments, the first and/or second diffractive optically variable effect generating structure is a zero order diffractive structure, as described above, and the parameters of the zero order diffractive relief structure are varied across at least the first sub-regions in accordance with image information of a first image. The pitch of a zero order diffractive relief structure is one means by which the colour of the zero order effect can be changed. Therefore, a colour image can be produced by varying the pitch across the sub-regions. This can be used to achieve image switch effects between two coloured images provided by respective zero order structures across the first and second sets of sub-regions, which each independently exhibit rotational colour shift effects.

While some embodiments may use zero order devices, preferably the first and/or second diffractive optically variable effect generating structures is a dispersive structure, i.e. one that exhibits a diffractive dispersion effect and, for example, diffracts white light incident along a single incidence direction into a range of angles in dependence on wavelength. As will be described below, dispersive structures include conventional first order diffraction gratings, which typically have pitches of 600 nm or more, as well as so-called nano-gratings, which have pitches less than 600 nm and typically in the range 600 nm to 200 nm. These types of structure are distinct from, for example, zero order diffraction gratings that operate only or primarily in the direction of specular reflection and do not exhibit a plane of diffractive dispersion.

In certain embodiments, at least one of the diffractive optically variable effect generating structures comprises a first order diffractive relief structure, such as a first order diffraction grating, i.e. typically having a pitch of 600 nm or more and more typically 700 nm or more. First order structures typically produce strong colour variation upon tilting that is strongly aligned with one direction of tilt. Providing first order structures in sub-regions with different average inclinations helps to improve the clarity of their respective optically variable effects when viewed in diffuse lighting conditions.

In other embodiments, at least one of the diffractive optically variable effect generating structures comprises a diffractive structure, such as a diffraction grating, having a pitch of 600 nm or less, preferably 550 nm or less, typically between 550 nm and 200 nm. Such nano-diffraction structures include those with directions of replay that are distant from the direction of specular reflection, and the different inclinations of the sub-regions can be used to increase the number of viewing angles at which a diffractive effect is exhibited and/or to move the diffractive effect to a more viable viewing angle.

Typically, the first and second diffractive optically variable effect generating structures differ in at least one of their pitch, orientation and size, shape and/or profile of the elements of the structure. However, in certain alterative embodiments, the structures may be the same.

In particularly preferable embodiments, the first and second optically variable effect generating structures comprise diffraction gratings, and the diffraction gratings of the first diffractive optically variable effect generating relief structure have a first orientation and the diffraction gratings of the second diffractive optically variable effect generating relief structure have a second orientation different from the first orientation such that the first and second optically variable effects are exhibited at different viewing angles. By providing both that the orientations of the gratings are different and that they are provided with different average inclinations, differentiation of their respective optical effects is improved, especially in diffuse lighting conditions as both orientation and inclination may contribute to these effects being visible at different viewing angles.

Preferably, the first and second orientations differ from an orientation in which the grating elements are aligned with the second direction in correspondence with the variation of the first and second average inclination away from the plane of the security element. For example, a neutral inclination may be considered one which is parallel with the plane of the security element and a neutral orientation one in which the grating elements are aligned with the second direction. In embodiments with more than two sub-regions, the direction and degree to which the orientations differ from the neutral position may correlate to the direction and degree to which the inclination differs from the neutral inclination. It should be stated here that an embodiment may not actually include a sub-region with a neutral inclination and neutral orientation of grating elements. Such devices may follow this principle with respect to a reference inclination and reference orientation of the grating elements, with a correlation between inclination direction and orientation direction being exhibited with respect to the reference. Preferably, the first orientation differs from an orientation in which the grating elements are aligned with the second direction by no more than 90°, preferably no more than 45°, in a first rotational direction and wherein the second orientation differs from an orientation in which the grating elements are aligned with the second direction by no more than 90°, preferably no more than 45°, in a second rotational direction.

In accordance with a second aspect of the invention there is provided a security document comprising a security element according to the first aspect. The security document may be one of a banknote, a polymer banknote, a cheque, a passport, an identity card, a certificate of authenticity, a fiscal stamp a licence, an identification document and a visa.

In accordance with a third aspect of the present invention, a method of manufacturing a security element is provided. The method comprises: providing a first layer having a first surface; forming the first surface of the first layer so as to define an array of image regions across the first surface, each image region comprising at least a first sub-region and a second sub-region wherein the first surface is formed such that each first sub-region has a first average inclination and such that each second sub-region has a second average inclination different from the first average inclination; providing a first diffractive optically variable effect generating relief structure in or on the first surface across the first sub-regions; and providing a second diffractive optically variable effect generating relief structure in or on the first surface across the second sub-regions; wherein the first diffractive optically variable effect generating relief structure and the first average inclination provide that the first optically variable effect is exhibited across the first sub-regions at least at a first viewing angle and the second diffractive optically variable effect generating relief structure and the second average inclination provide that the second optically variable effect is exhibited across the second sub-regions at least at a second viewing angle different from the first viewing angle.

It will be appreciated that the various preferable features described above with reference to the first aspect apply equally to the present method. That is, the method may be adapted to form a security element with any of the above described features.

Preferably, forming the first surface of the first layer so as to define an array of image regions further comprises forming the first surface of the first layer so as to provide the first and second diffractive optically variable effect generating relief structures in the first surface across the first and second sub-regions. It is particularly advantageous to simultaneously form the surface inclinations and the diffractive relief structures as this produces an integrally registered structure. Preferably, the first layer is a first layer of curable material and wherein forming the first surface of the first layer comprises casting the first surface of the first layer so as to define the structure and curing the first layer so as to fix the structure in the first surface of the first layer.

Preferably, the method further comprises depositing an opaque reflector layer onto the first surface in at least the first and second sub-regions. An opaque reflector layer enhances diffractive efficiency, improving the appearance of the optically variable effects.

BRIEF DESCRIPTION OF THE DRAWINGS

Examples of security elements will now be described with reference to the accompanying drawings, in which:

FIG. 25 shows, schematically, a plan view of a security element according to an eleventh embodiment of the invention;

DETAILED DESCRIPTION

A security element according to a first embodiment will now be described with reference to FIGS. 1 to 4B.

Figure 1:
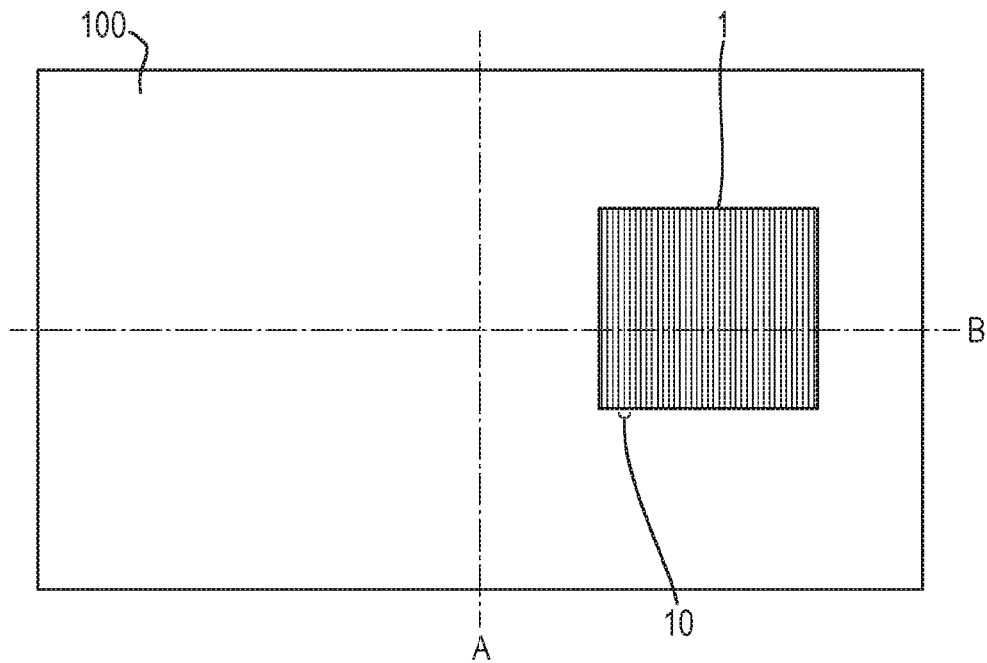
FIG. 1 shows, schematically, a security document including a first embodiment of a security element.

FIG. 1 shows a security document 100, in this case a banknote, with a security element 1. The security document has a short axis A and a long axis B perpendicular to the short axis. The security document is observed during normal viewing with the short axis A being substantially vertical and the long axis B being substantially horizontal. The security element has a first surface that faces away from the security document. This first surface is made up of an array of image regions 10, in this case elongate image regions, each elongate image region extending in a first direction, i.e. along the direction of the axis A. The array of elongate image regions are arranged so as to repeat along a second direction along the surface, i.e. along the direction of axis B, the image regions repeating so as to provide the width of the security element.

Figure 2:
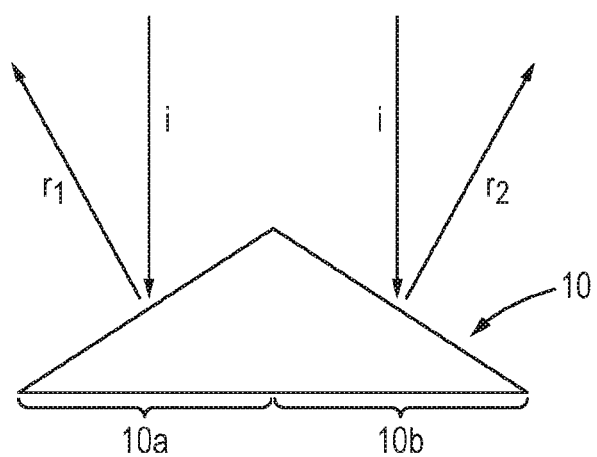
FIG. 2 shows, schematically, how light interacts with a portion of the security element of the first embodiment.

FIG. 2 shows the arrangement of the surface of the security element in one image region 10 in cross-section along the direction of axis B. The image region 10 has a triangular cross-section defining two facets in the image region. The first facet provides a first sub-region 10a of the image region and the second facet provides a second sub-region 10b of the image region. As shown in FIG. 2, light that is incident on the image region 10 along direction i is reflected in two different directions $r_1$ and $r_2$ owing to the different inclinations of the two facets in the image region 10. The different inclinations act to change the incidence angle at which light interacts with the surface of the security element.

Figure 3A:
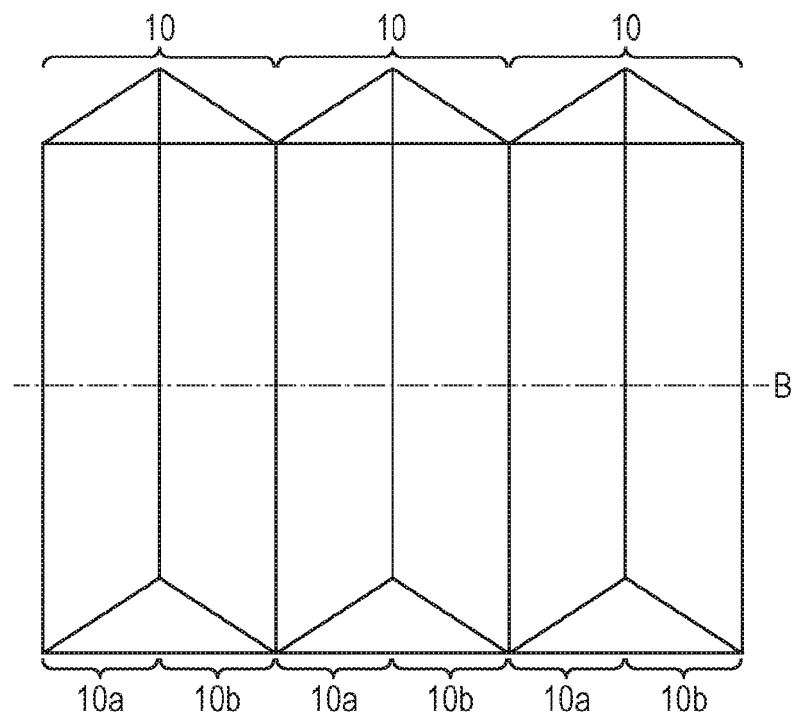
FIGS. 3A and 3B show, schematically, a perspective view of an enlarged portion of the security element according to the first embodiment and a plan view of the enlarged portion of the security element including the diffractive structures on the surface.

FIG. 3A shows a small area of the security element, illustrating the arrangement of the surface of the security element across three image regions 10 in a perspective view. As can be seen in this figure, each image region has an elongate triangular prism shape, providing each image region with two facets facing away from the security document. The triangular prism is elongate along the direction of axis A (which corresponds to the "first direction" or "image region axis" mentioned above) and has substantially constant cross-section as viewed along the direction of axis B (which corresponds to the second direction mentioned above). FIG. 3A shows only three image regions 10, but it will be appreciated that many more are typically used to make up the full security element. Each image region 10 has a respective first sub-region 10a, being a facet that is inclined away from being parallel with the security document towards the viewer's left. Each first sub-region 10a across the image regions 10 has substantially the same inclination such that the first sub-regions all have the same effect on the angle of incidence of light. Each image region also has a respective second sub-region 10b, being a facet that is inclined away from being parallel with the security document towards the viewer's right. Again, all inclinations are substantially the same for each second sub-region 10b.

In FIG. 3A, the inclinations shown are purely schematic and the actual angle the facet makes to the surface of the document will be selected depending on the degree to which it is desired that the angle of incident light varies between the different sub-regions. Another factor in the selection of the inclinations of the facets is the obscuring effect the facets forming the first sub-regions 10a will have on the facets forming the second sub-regions 10b and vice versa. For example, for more pronounced inclinations, over a large range of viewing angles, the facets forming the first sub-regions 10a may entirely obscure the facets forming the second sub-regions 10b, thereby providing viewing angles over which the optically variable effects exhibited by the different sub-regions cannot be seen simultaneously. In some implementations, however, this obscuring effect may be negligible.

Figure 3B:
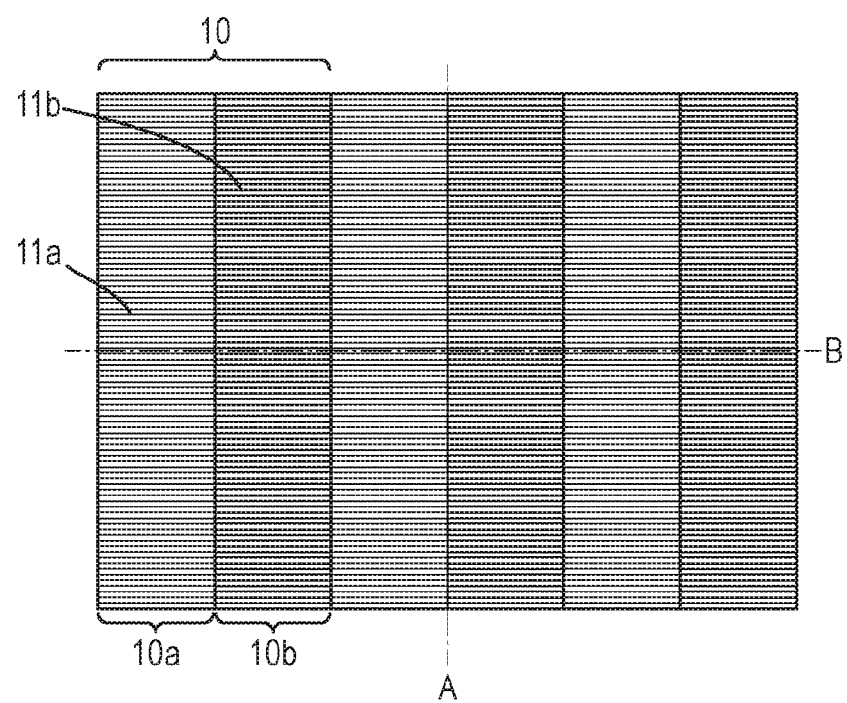

FIG. 3B shows the small area of the security element from FIG. 3A in plan view, illustrating the diffraction gratings provided in the surface of the security element across the sub-regions 10a and 10b. In this embodiment, each first sub-region 10a, which corresponds to those facets inclined towards the viewer's left, is provided with a first diffraction grating 11a having a first pitch. Each second sub-region 10b, which corresponds to those facets inclined towards the viewer's right, is provided with a second diffraction grating 11b having a second pitch. The diffraction gratings 10a and 10b have the same orientation in this embodiment, which is such that the grating lines extend perpendicular to axis A across the surface of the security element, i.e. in the direction of repetition of the image regions. A diffraction grating typically diffracts light generally in a plane perpendicular to the grating elements, meaning that these gratings will diffract light in generally the same direction owing to their identical orientation.

Figure 4A:
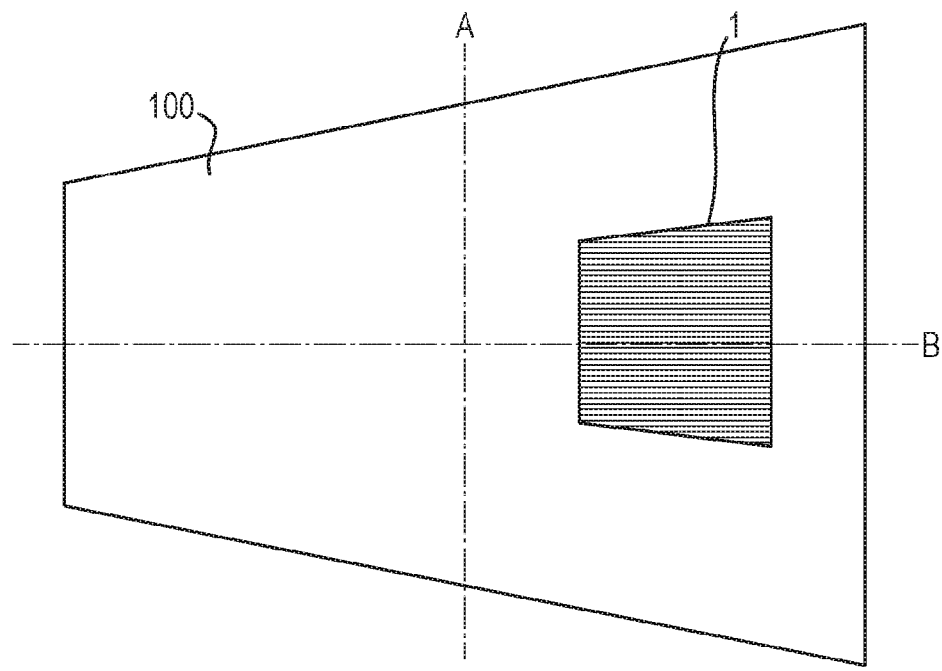
FIGS. 4A and 4B show, schematically, the security document including the security element of the first embodiment at first and second viewing angles.
Figure 4B:
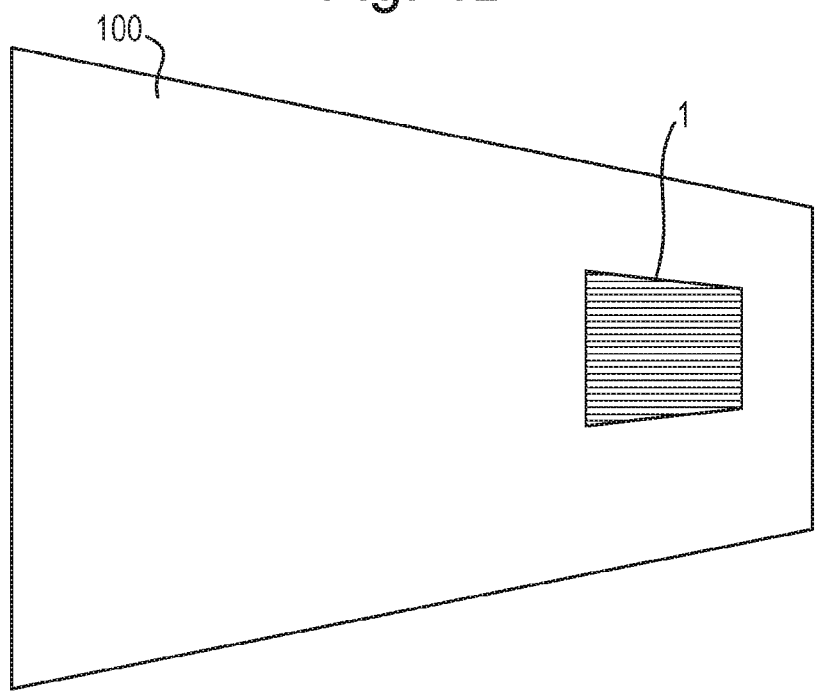

FIGS. 4A and 4B illustrate the appearance of the security document including the security element described above. FIG. 4A shows the security document 1 rotated about axis A such that the right-hand side of the document is closer to the viewer than the left-hand side. This effectively rotates the security element 1 about the long axis of the image regions 10 such that the second sub-regions 10b are closer to being perpendicular to the viewing direction than the first sub-regions 10a. Hence, when viewed in a light source positioned generally overhead, the second diffraction grating 11b exhibits its diffractive effect, while the first diffraction grating 11a does not. In this case, the first diffraction grating 11a does not exhibit its diffractive effect as the inclination of first sub-regions 10a acts to reflect light away from the viewer. While viewing the effect produced by the second diffraction grating 11b, rotating the security document about axis B causes the security element to vary in appearance according to the diffractive effect produced by the second diffraction grating 11b.

FIG. 4B shows the security document 1 rotated about axis A such that the left-hand side of the document is closer to the viewer than the right-hand side. Here, the first sub-regions 10a are closer to being perpendicular to the viewing direction than the second sub-regions 10b. Accordingly, when viewed in the same conditions as in FIG. 4A, the first diffraction grating 11a exhibits its diffractive effect, while the second diffraction grating 11b does not. Again, the second diffraction grating 11b does not exhibit its diffractive effect as now the inclination of second sub-regions 10b acts to reflect light away from the viewer. While viewing the effect produced by the first diffraction grating 11a, rotation of the security document about axis B causes the security element to vary in appearance according to the diffractive effect produced by the first diffraction grating 11a. Since the first and second diffraction gratings have different pitches, they exhibit different effects, thereby providing the security element with different optically variable effects when rotated about axis B depending upon the positioning of the security document about the axis A. This increases the complexity of the optically variable effect exhibited and provides some degree of optical variability upon rotation about the axis A in addition to the optical variability provided by the diffractive effect of the gratings upon rotation about axis B.

Figure 5A:
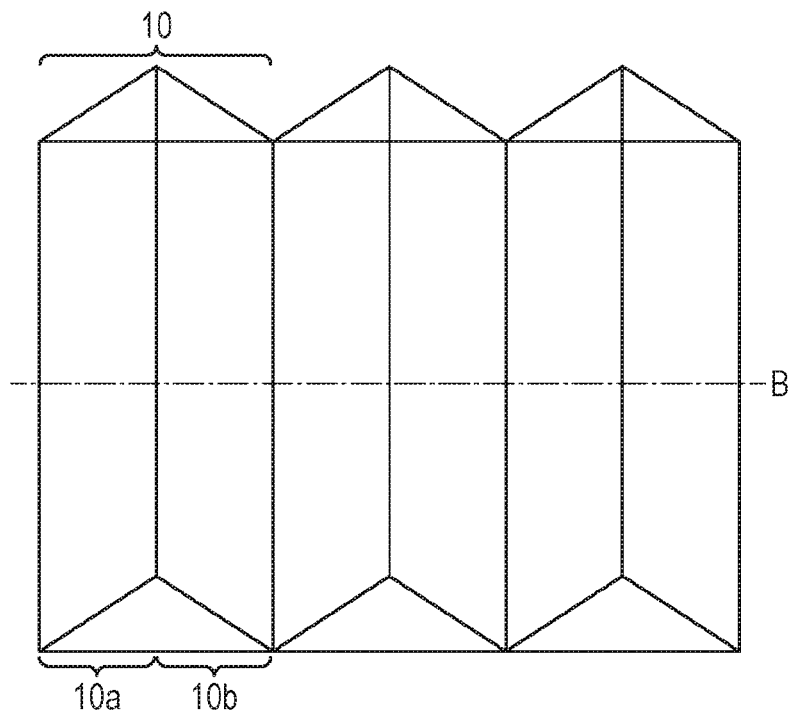
FIGS. 5A and 5B show, schematically, a perspective view of an enlarged portion of a security element according to a second embodiment and a plan view of the enlarged portion of the security element including the diffractive structures on the surface.
Figure 5B:
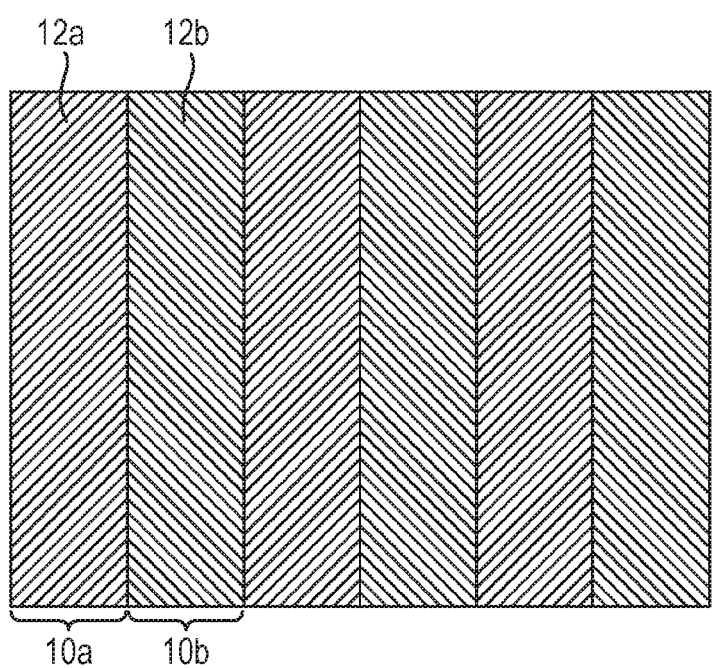

A further embodiment is shown in FIGS. 5A to 6B. In this embodiment, the surface of the security element 1 has the same triangular prismatic shape defining first and second sub-regions as the first embodiment, as shown in FIG. 5A. This embodiment differs in the orientations of the diffraction gratings provided in the first and second sub-regions 10a, 10b. Specifically, the first sub-regions 10a are provided with a first diffraction grating 12a having grating orientation rotated anticlockwise compared with the first diffraction grating of the first embodiment. That is, the grating elements are no longer perpendicular to axis A, i.e. the long axis of the image regions 10. Similarly, the second sub-regions 10b are provided with a second diffraction grating 12b having grating orientation rotated compared with the second diffraction grating of the first embodiment; however, the second diffraction grating is rotated clockwise compared with the second diffraction grating of the first embodiment. As has been mentioned, diffraction gratings typically act to diffract light along a direction perpendicular to the grating lines. Therefore, the orientation of the diffraction gratings in this embodiment acts to diffract light with a component along the direction of axis B. This difference in orientation provides that the two diffraction gratings will have effects visible at different viewing angles upon rotation about axis A. The different inclinations of the first and second sub-regions 10a, 10b complement the grating orientations to further separate the two grating effects upon rotation about axis A.

Figure 6A:
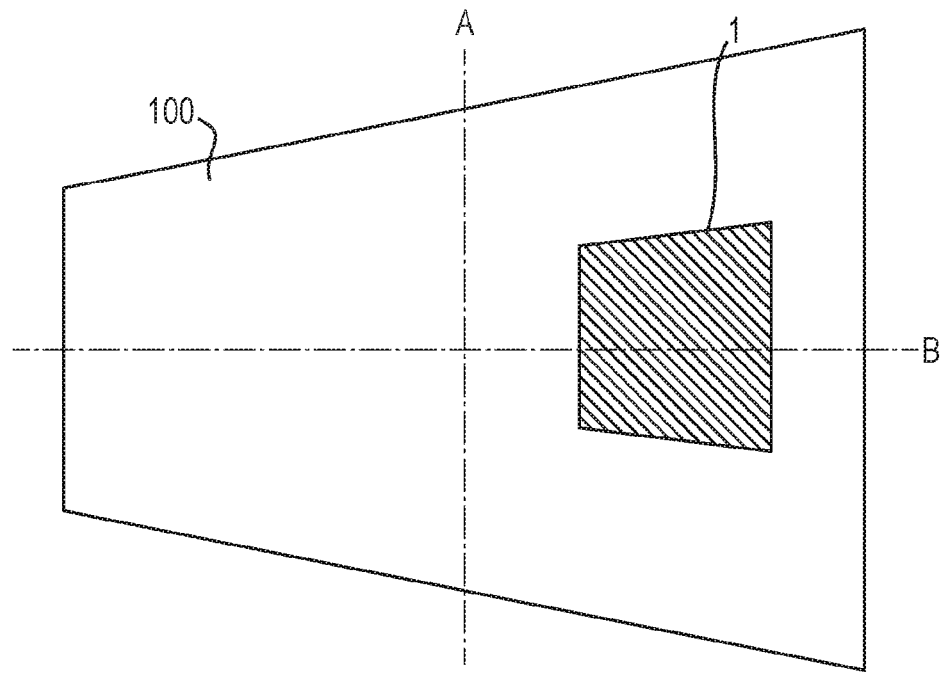
FIGS. 6A and 6B show, schematically, a security document including the security element of the second embodiment at first and second viewing angles.
Figure 6B:
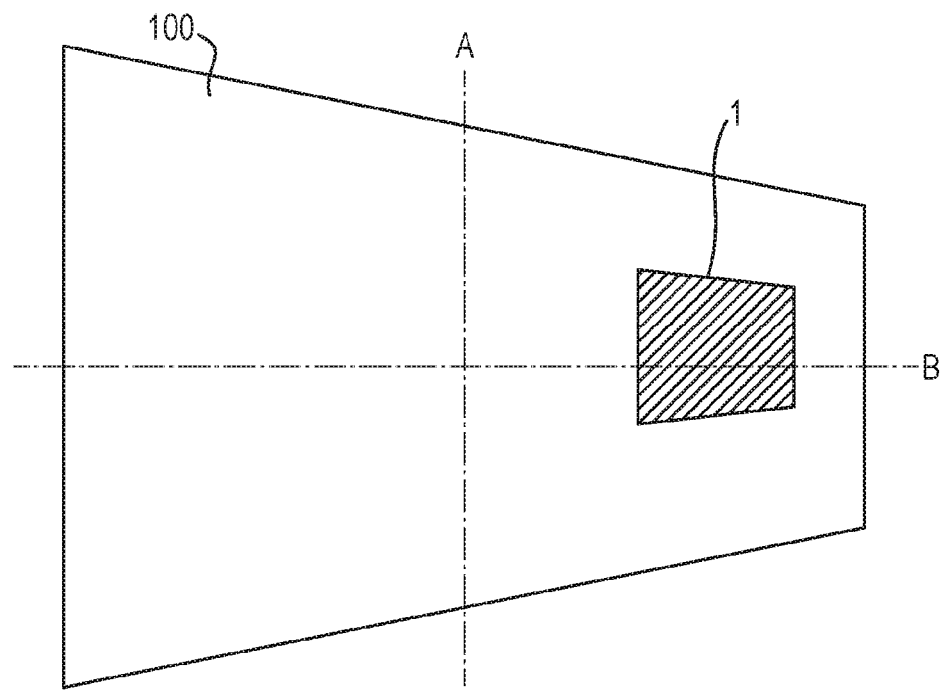

FIGS. 6A and 6B illustrate the appearance of the security element on a security document. FIG. 6A shows the security document 1 rotated about axis A such that the right-hand side of the document is closer to the viewer than the left-hand side, while FIG. 6B shows security document 1 rotated about axis A such that the left-hand side of the document is closer to the viewer than the right-hand side. When viewed in the position of FIG. 6A, the inclinations of the second sub-regions 10b and the orientation of the second diffraction grating 12b combine to provide that the diffractive effect of the second diffraction grating 12b is visible. Meanwhile, the inclinations of the first sub-regions 10a and the orientation of the first diffraction grating 12a combine to provide that the diffractive effect of the first diffraction grating 12a is substantially not visible. Because both the inclinations of the sub-regions 10a, 10b and the orientations of the gratings 12a, 12b contribute to the direction in which the diffractive effect is visible, the appearance of the security element is improved, particularly in more diffuse lighting conditions in which light is incident on the security element from more than one direction. When viewed in the position of FIG. 6B, the inclinations of the first sub-regions 10a and the orientation of the first diffraction grating 12a combine to provide that the diffractive effect of the first diffraction grating 12a is visible, while the inclinations of the second sub-regions 10b and the orientation of the second diffraction grating 12b combine to provide that the diffractive effect of the second diffraction grating 12b is substantially not visible.

When viewed in either the position of FIG. 6A or 6B, the security element may still exhibit optical variability when rotated about the axis B. This optical variability will result from the diffractive effect exhibited by the corresponding diffraction grating and will be dependent upon the degree to which the grating elements are rotated away from perpendicular to axis A, as well as other grating parameters such as pitch and profile. In particular, the closer the grating elements are to perpendicular to axis A, the more strongly aligned the diffractive effect will be with rotation about axis B.

In the above embodiments, the diffraction gratings have been described as being provided entirely across each of the respective sets of first sub-regions 10a and second sub-regions 10b. However, it will be appreciated that this simplicity is merely to aid in understanding the effects utilised in the invention. In practice the diffraction gratings in these sub-regions may be provided only in certain areas of the sub-regions and/or multiple grating types with different grating parameters may be used. FIGS. 7A to 8B illustrate such an embodiment.

Figure 7A:
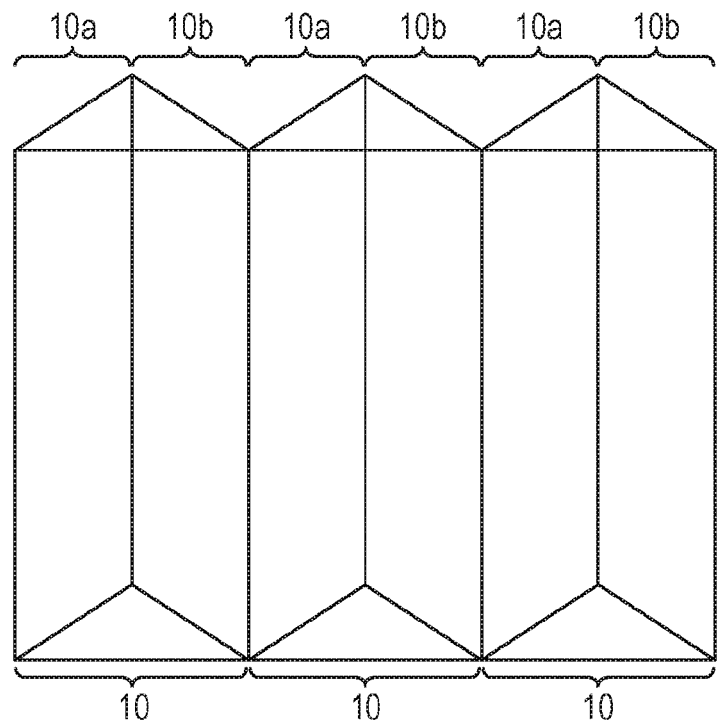
FIGS. 7A and 7B show, schematically, a perspective view of an enlarged portion of a security element according to a third embodiment and a plan view of the enlarged portion of the security element including the diffractive structures on the surface.
Figure 7B:
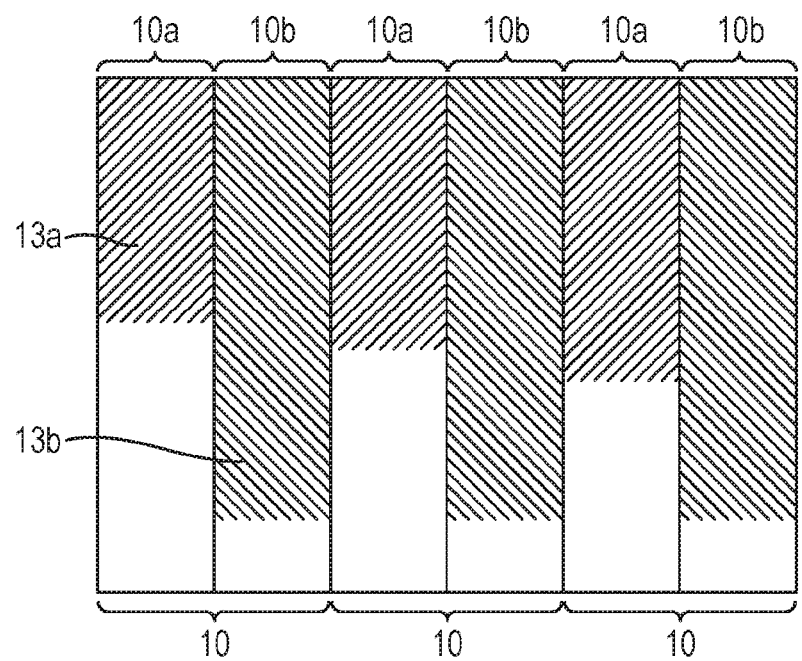

FIG. 7A illustrates a small area of the surface of the security element 1 and shows the same triangular prismatic shape defining sets of first and second sub-regions 10a, 10b as used in the first and second embodiments. FIG. 7B shows in schematic plan view the arrangement of first and second diffraction gratings 13a, 13b across the first and second sub-regions 10a, 10b in the area shown in FIG. 7A. Here, the first diffraction grating 13a is not provided over the entirety of the first sub-regions 10a, but instead is provided in areas so as to define an image, in this case a circle. That is each first sub-region 10a corresponds to a slice of the image to be displayed and the first diffraction grating 13a is provided in each sub-region so as to delimit the corresponding slice. Similarly, the second diffraction grating 13b is not provided over the entirety of the second sub-regions 10b, but instead is provided in areas so as to define a second image, in this case a triangle. For both sets of sub-regions, the areas not including the first and second diffraction gratings 13a, 13b are left empty such that no diffractive effect is exhibited at any viewing angle in those regions. In this embodiment, the diffraction gratings 13a, 13b are provided with the same orientations as in the second embodiment; however, any orientation could be used.

Figure 8A:
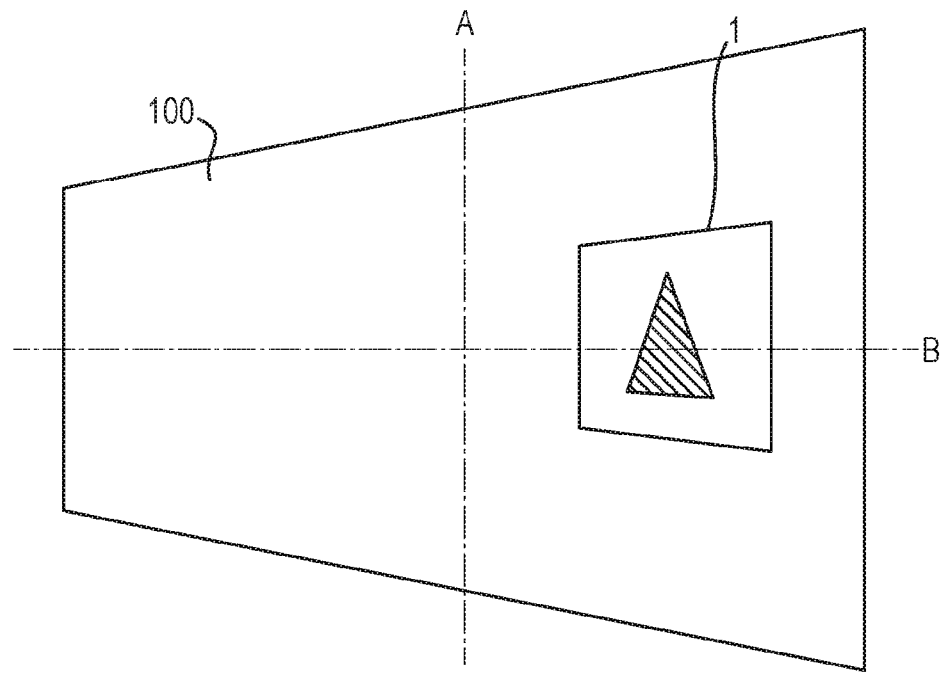
FIGS. 8A and 8B show, schematically, a security document including the security element of the third embodiment at first and second viewing angles.
Figure 8B:
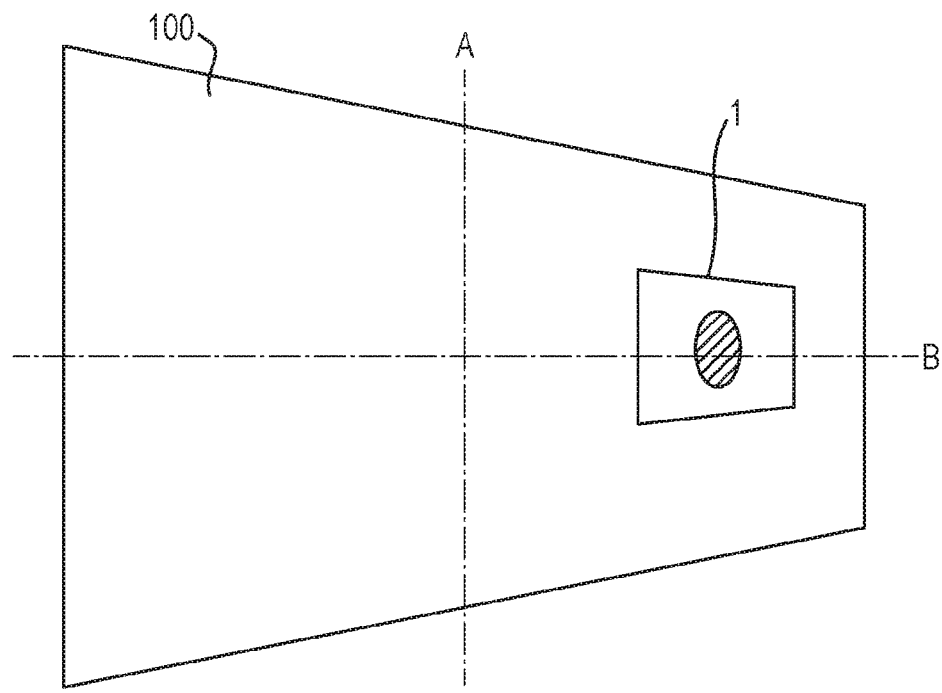

FIGS. 8A and 8B illustrate the appearance of the security element on a security document. FIG. 8A shows the security document 1 rotated about axis A such that the right-hand side of the document is closer to the viewer than the left-hand side, while FIG. 8B shows security document 1 rotated about axis A such that the left-hand side of the document is closer to the viewer than the right-hand side. When viewed in the position of FIG. 8A, the inclinations of the second sub-regions 10b and the orientation of the second diffraction grating 13b combine to provide that the diffractive effect of the second diffraction grating 13b is visible and hence a triangle is displayed against a blank background. When viewed in the position of FIG. 8B, the inclinations of the first sub-regions 10a and the orientation of the first diffraction grating 13a combine to provide that the diffractive effect of the first diffraction grating 12a is visible and hence a circle is displayed against a blank background.

As with the above embodiments, rotation about the axis B will typically cause the image of the triangle or the circle to vary in brightness or colour as the diffractive effect of the corresponding diffraction grating is cycled through and the precise effect will depend on the configuration of the grating parameters.

While in this embodiment the areas not containing the first and second diffraction gratings 13a, 13b are left empty such that each image is viewed against a blank background, it will be appreciated that more than one type of grating may be used in either of the first and second sub-regions 10a, 10b. For example, those empty areas may instead be provided with third and fourth diffraction gratings such that the triangle or circle are defined against a background also exhibiting a diffractive effect. Alternatively, more complex images could be provided comprising different diffraction gratings making up different components or elements of the image. For example, gratings with different pitches may be used to provide regions of two or more different diffractive colours.

While different images, i.e. a circle and triangle, are used in this embodiment, in alternative embodiments the images may be conceptually related. For example, the images may present an animation effect of an image upon rotation about axis A. This is particularly effective where more than two sub-regions are used, providing more steps or "frames" to the animation. In other examples, the second image may be a perspective altered version of the first image. In such examples, the viewing angles that result from the combined effect of the inclinations of the sub-regions and the grating parameters of the structures in each sub-region may be configured such that, at least at one viewing position, a different one of the images is presented to each of the viewer's eyes, such that a stereoscopic effect is perceived.

The above embodiments have described a security element whose surface defines a series of triangular prisms, with each image region having only two facets of a corresponding prism providing first and second sub-regions. It will be appreciated however that other arrangements of the surface of the security element may be used if they provide sub-regions with different average inclinations. For example, the surface may define three facets in each image region, thereby providing three sub-regions with different average inclinations and respective diffractive structures. This may provide three different viewing angles in a direction of rotation about axis A that exhibit respective diffractive effects. Alternatively, the surface may comprise a series of convex surface elements, with each convex element being divided into two or more sub-regions with respective diffractive structures. An example of such a security element is described below.

Figure 9:
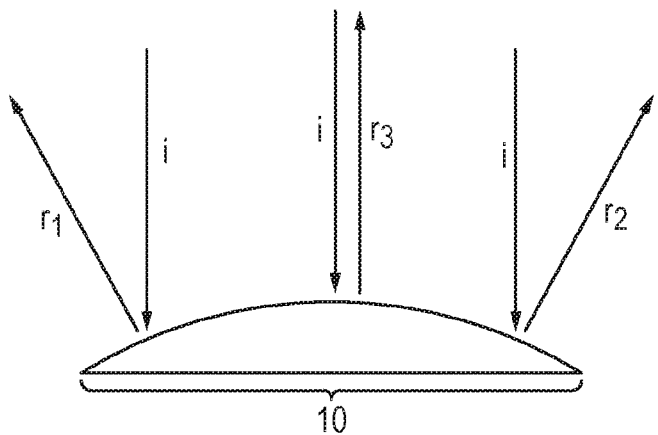
FIG. 9 shows, schematically, how light interacts with a portion of a security element according to a fourth embodiment.

FIG. 9 shows the arrangement of the surface of a further security element in one image region 10 in cross-section along the direction of axis B. The surface has a convex shape in cross-section, specifically having a circular segment cross-section. FIG. 9 shows light incident on the surface of the image region along with direction i at three different points across the image region 10. At the left-hand side of the image region 10, the light is reflected along direction $r_1$, which is towards the left of the image region. At the right-hand side of the image region 10, the light is reflected along direction $r_2$, towards the right of the image region. Finally, light reflected at the centre of the image region 10 is reflected along direction $r_3$, which is back along the direction of incoming light i. While only three incoming rays are shown here, it will be appreciated that, for a fixed incidence direction, each point across the image region 10 will reflect light in a different direction. This makes convex elements particularly suited to use with diffraction gratings having pitches of around 600 nm or less (typically between 550 nm and 350 nm), which can exhibit diffractive effects only at specific viewing angles, e.g. steep viewing angles. The tendency of a convex surface to reflect light in many directions effectively increases the viewing angles at which the diffractive criteria will be fulfilled.

Figure 10:
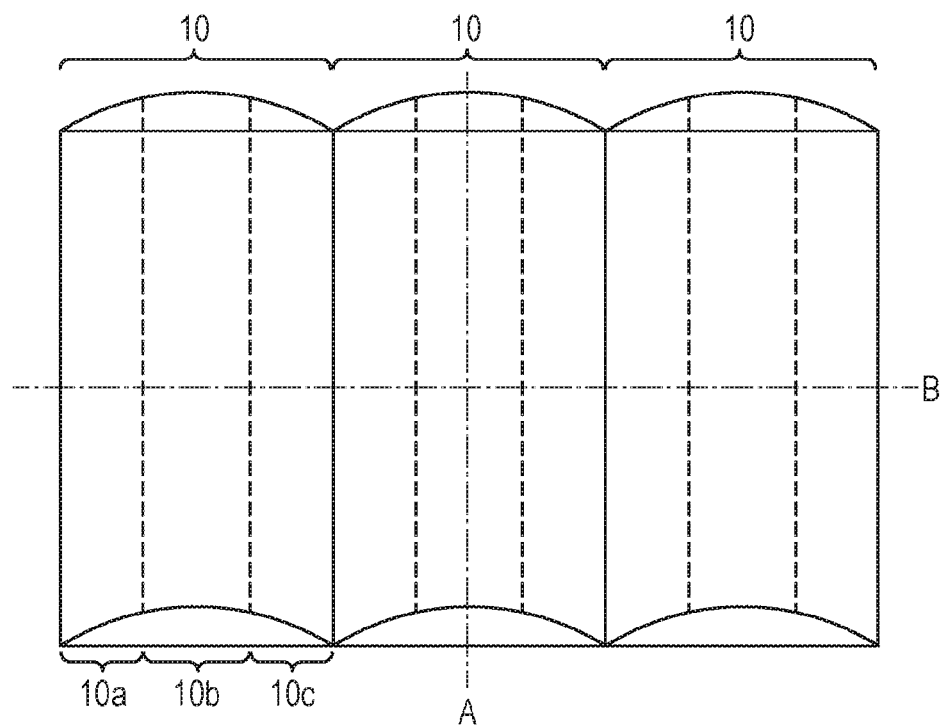
FIG. 10 shows, schematically, a perspective view of an enlarged portion of a security element according to the fourth embodiment.

FIG. 10 shows a small area of the security element, illustrating the arrangement of the surface of the security element across three image regions 10 in a perspective view. As can be seen in this figure, each image region 10 is elongate with a constant circular segment cross-section, defining a partial cylinder shaped image region 10. Each image region is divided lengthwise into three sub-regions 10a, 10b, 10c, which will be provided with respective diffractive structures. While three image regions are used here, it will be appreciated that this shape of image region can be divided into as many sub-regions as required, each of which will have different average inclinations.

Figure 11:
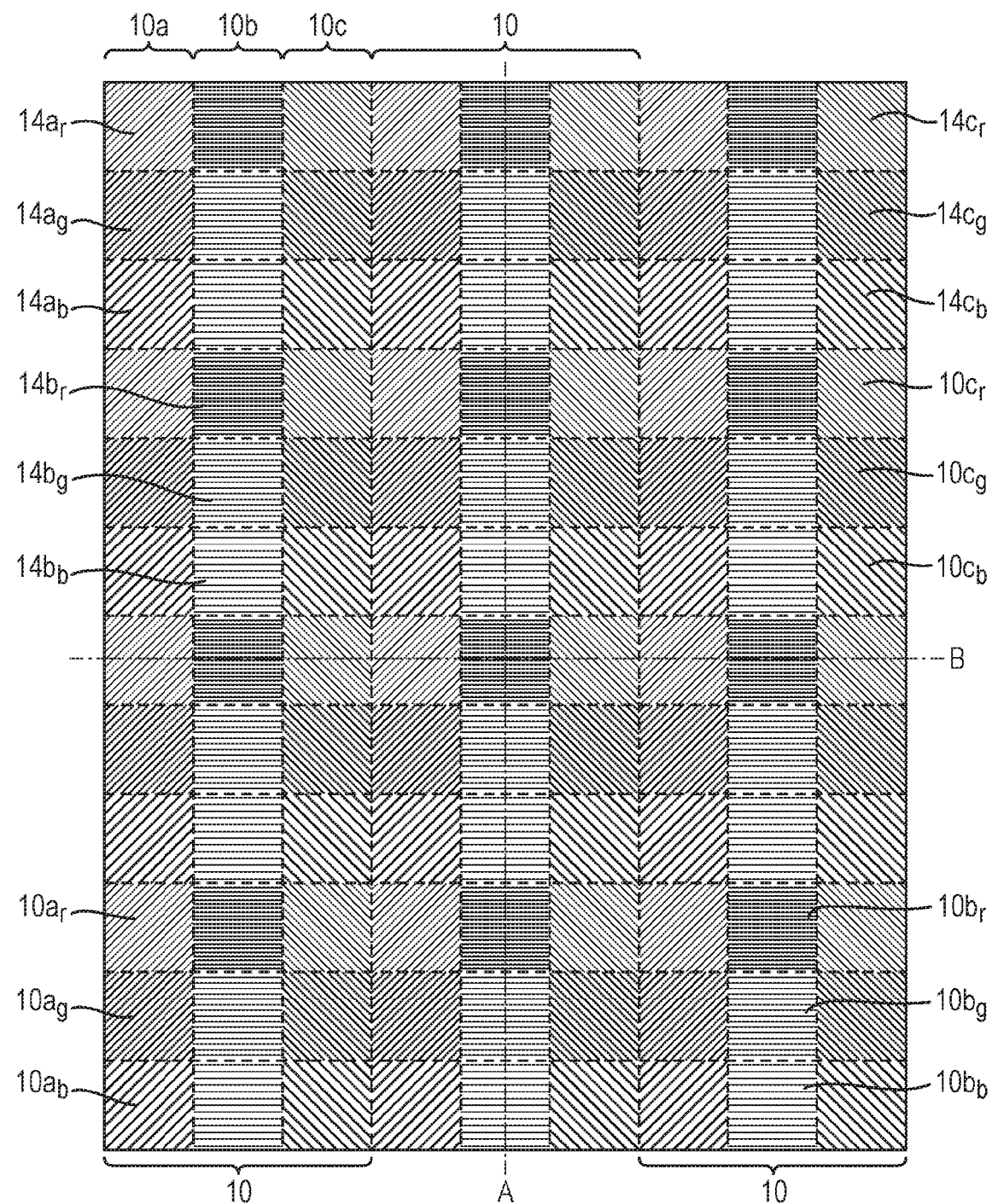
FIG. 11 shows, schematically, a plan view of the enlarged portion of the security element of the fourth embodiment including the diffractive structures on the surface.
Figure 12:
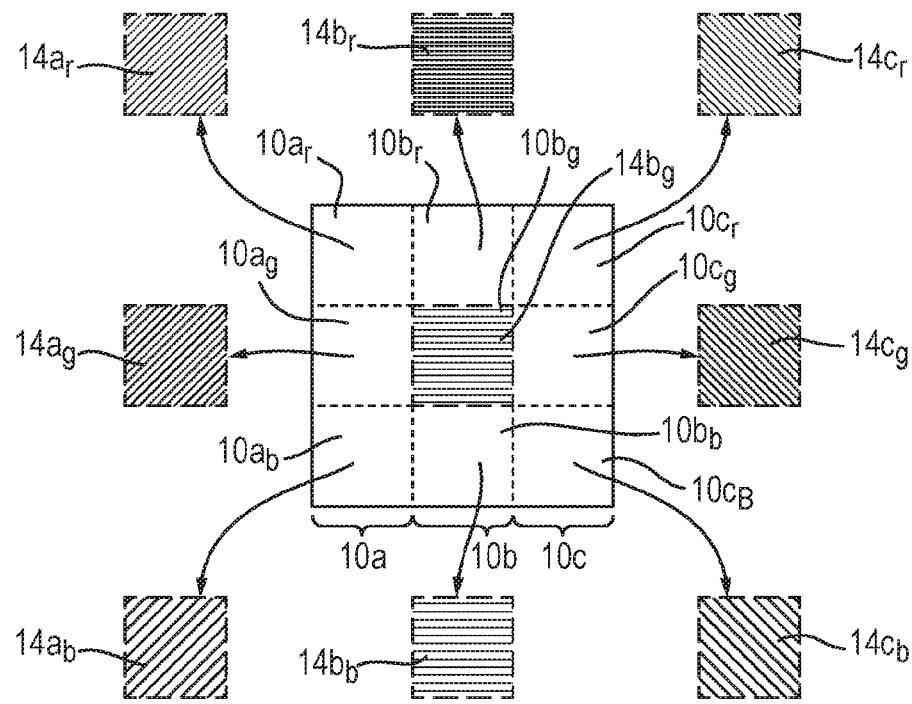
FIG. 12 shows, schematically, the unit cell by which the diffractive structures are arranged on the surface of the security element of the fourth embodiment.

FIG. 11 shows, schematically, a plan view of the small area of the security element shown in FIG. 10, illustrating the arrangement of diffractive structures on the surface. In this embodiment, each first sub-region is divided into a series of interlaced primary, secondary and tertiary areas $10a_r$, $10a_g$, $10a_b$, these areas being of equal size and being interlaced in a regular fashion along the direction of axis A. Similarly, the second sub-region 10b is divided into repeating interlaced areas $10b_r$, $10b_g$, $10b_b$ and the third sub-region 10c is divided into repeating interlaced areas $10c_r$, $10c_g$, $10c_b$. The image region 10 may be considered to be constructed from a repeating unit cell comprising one each of the areas $10a_r$, $10a_g$, $10a_b$, $10b_r$, $10b_g$, $10b_b$, $10c_r$, $10c_g$, and $10c_b$. This unit cell is shown more clearly in FIG. 12.

In the first sub-region 10a, the primary areas $10a_r$ are provided with a diffraction grating $14a_r$. This diffraction grating has an orientation rotated anti-clockwise from a position in which the grating elements are perpendicular to the axis A, such that light is diffracted along a direction with a component along the direction of axis B. This diffraction grating $14a_r$ is configured such that at a predetermined viewing angle the grating exhibits a red diffractive colour. Similarly, the secondary areas $10a_g$ are provided with a diffraction grating $14a_g$ with the same orientation as the diffraction grating $14a_r$ and configured such that at the predetermined viewing angle the grating exhibits a green diffractive colour. Finally, the tertiary areas $10a_b$ are provided with a diffraction grating $14a_b$ with the same orientation as the diffraction grating $14a_r$ and configured such that at the predetermined viewing angle the grating exhibits a blue diffractive colour. In the Figure, each area is shown as being filled with the corresponding diffraction grating; however, it will be appreciated that these gratings may be provided only in selected areas $10a_r$, $10a_g$, $10a_b$ or only partially in some areas depending on the desired final appearance of the security element. When the security element is viewed at the predetermined viewing angle, which will be rotated about the axis A so that the left-hand side of the element is closer to the viewer and rotated about the axis B by a predetermined amount, the diffraction gratings $14a_r$, $14a_g$, $14a_b$ will replay their respective colours. The areas $10a_r$, $10a_g$, $10a_b$ may thereby act as red, green and blue pixels in building up a full colour image across the first sub-regions. Rotation of the security element about the axis B may cause the diffraction gratings $14a_r$, $14a_g$, $14a_b$ to cycle through their diffractive effects.

Similarly to the first sub-region, the set of second sub-regions 10b is provided with respective diffraction gratings $14b_r$, $14b_g$, $14b_b$ in the corresponding areas $10b_r$, $10b_g$, $10b_b$. Here, the diffraction gratings all have an orientation such that the grating elements are perpendicular to the axis A so that the element is configured for viewing along directions perpendicular to the axis B. The diffraction gratings are also configured, e.g. by pitch, such that at a predetermined viewing angle, they exhibit red, green and blue diffractive colours respectively. The second sub-region may thereby build up a full colour image that may be different to the image from the first sub-regions.

Finally, the set of third sub-regions 10c is provided with respective diffraction gratings $14c_r$, $14c_g$, $14c_b$ in the corresponding areas $10c_r$, $10c_g$, $10c_b$. Here, the diffraction gratings all have are oriented to be rotated clockwise from a position in which the elements are perpendicular to the axis A. When the security element is viewed at the predetermined viewing angle, which will be rotated about the axis A so that the right-hand side of the element is closer to the viewer and rotated about the axis B by a predetermined amount, the diffraction gratings $14c_r$, $14c_g$, $14c_b$ will replay their respective colours and may thereby build up a full colour image that may be different to the images from the first and second sub-regions.

This security element therefore provides three different images visible at different viewing angles upon rotation about the axis A. When viewing any one of the images, rotation about axis B may then cycle the image through diffractive colours exhibited by the gratings.

While dispersive diffraction gratings are used in the above embodiment, alternatively, such a surface arrangement may be used to provide the optical variability for a structure such as a zero order diffractive relief structure that exhibits no diffractive dispersion. For example, three respective images may be formed in the three sets of sub-regions across the image regions of the device by respective zero order diffractive relief structures. Since a zero order diffractive device exhibits its effect in the direction of specular reflection, the security device will be optically variable upon rotation about the axis A owing to the varying local surface normal along this direction of the device. For example, when the device is viewed from the left, the left sub-region within each image region may reflect incident light towards the viewer such that the corresponding left image is visible as a result of the combined appearance of these left sub-regions across the element. When the device is viewed along the normal, light may be reflected from the centre sub-region towards the viewers, thus displaying this centre image. Finally, when the security element is viewed from the right, light may be reflected from the right sub-regions to the viewer such that the right image is visible.

Figure 13:
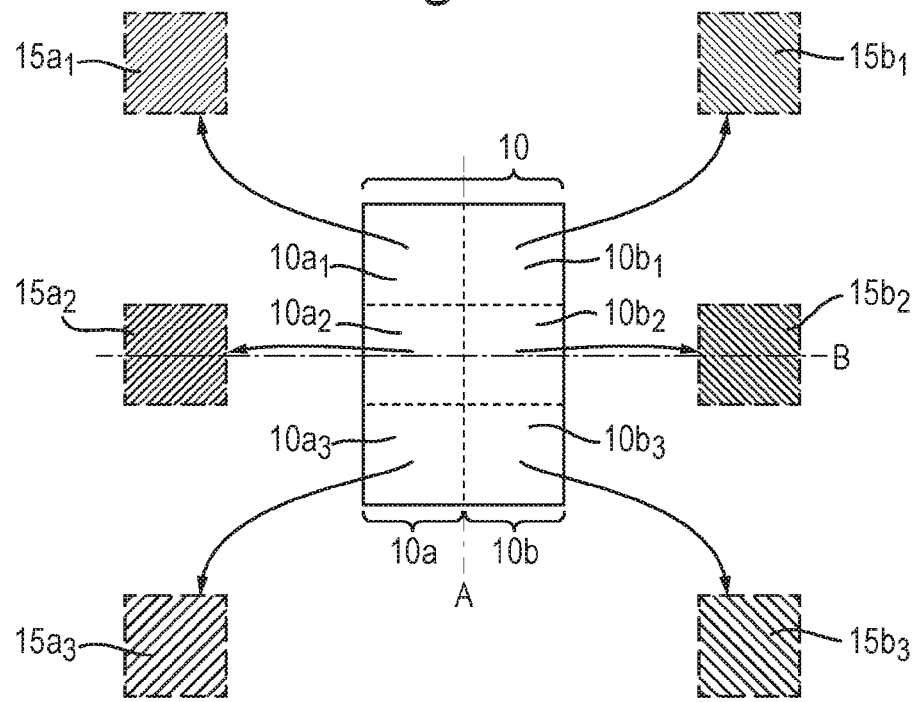
FIG. 13 shows, schematically, the unit cell by which the diffractive structures are arranged on the surface of the security element of a fifth embodiment.

FIG. 13 shows another example of a unit cell arrangement for diffraction gratings across an array of image regions 10. The image regions may be shaped as triangular prisms or convex elements as in the above embodiments. Each image region is divided lengthwise into first and second sub-regions 10a, 10b. The first sub-region comprises primary, secondary and tertiary areas $10a_1$, $10a_2$, $10a_3$. The second sub-region also comprises primary, secondary and tertiary areas $10b_1$, $10b_2$, $10b_3$. As mentioned, FIG. 13 represents a unit cell and so shows only one of each of these areas, but each sub-region of the security element will comprise a plurality of each of these areas in a repeating interlaced fashion along the length of the sub-region.

In the first sub-region 10a, the primary area $10a_1$ is provided with diffraction grating $15a_1$, the secondary area $10a_2$ is provided with grating $15a_2$ and the tertiary area $10a_3$ is provided with grating $15a_3$. These gratings are each rotated anti-clockwise from an orientation in which the grating elements are perpendicular to the axis A (the long axis of the image regions). The gratings $15a_1$, $15a_2$, $15a_3$ are each rotated by a different amount so as to have different orientations. In this embodiment, the gratings each have an orientation rotated between 45° and 90° from perpendicular to the axis A so that the diffractive effect is not closely aligned with rotation about axis B. Instead, rotation about axis B tends to cause the diffractive effect to switch on and then off over a short rotation angle.

In the second sub-region 10b, the primary area $10b_1$ is provided with diffraction grating $15b_1$, the secondary area $10b_2$ is provided with grating $15b_2$ and the tertiary area $10b_3$ is provided with grating $15b_3$. These gratings are each rotated clockwise from an orientation in which the grating elements are perpendicular to the axis A (the long axis of the image regions). Again, the gratings $15b_1$, $15b_2$, $15b_3$ are each rotated by a different amount between 45° and 90° from perpendicular to the axis A.

Again, the Figure shows each area being entirely filled with diffraction grating; however, it will be appreciated that this is for illustration only and in practice the diffraction grating will be provided across selected areas in accordance with a desired image design.

When the security element of FIG. 13 is viewed, each of the diffraction gratings $15a_1$, $15a_2$, $15a_3$, $15b_1$, $15b_2$, $15b_3$ may be visible at a different viewing angle, allowing for six different images to be displayed. Specifically, when the security element is rotated about axis A so that the left-hand side of the security element is closer to the viewer than the right-hand side, the diffraction gratings $15a_1$, $15a_2$, $15a_3$ in the first sub-region 10a will be visible in turn at different viewing angles upon rotation about the axis B owing to their different orientations. The different diffraction gratings may therefore be arranged so as to display to a viewer different images. Similarly, when the security element is rotated about axis A so that the right-hand side of the security element is closer to the viewer than the left-hand side, the diffraction gratings $15b_1$, $15b_2$, $15b_3$ in the second sub-region 10b will be visible in turn at different viewing angles upon rotation about the axis B owing to their different orientations.

In the above embodiments, the security elements are configured for viewing with the elongate image regions arranged substantially vertically; however, it is also possible to configure the security elements for viewing with the elongate image elements extending substantially horizontally. In such an arrangement, the inclination of the sub-regions contribute to optical variability as the security element is rotated about its horizontal axis since the first surface will typically be arranged such that incident light is reflected in different directions in a substantially vertical plane. For diffraction gratings in particular, a general rule for configuring the viewing orientation is that the grating elements should extend generally horizontally, e.g. within 45° of the horizontal axis of the security element. FIG. 15 illustrates an embodiment configured for viewing in this manner.

Figure 14A:
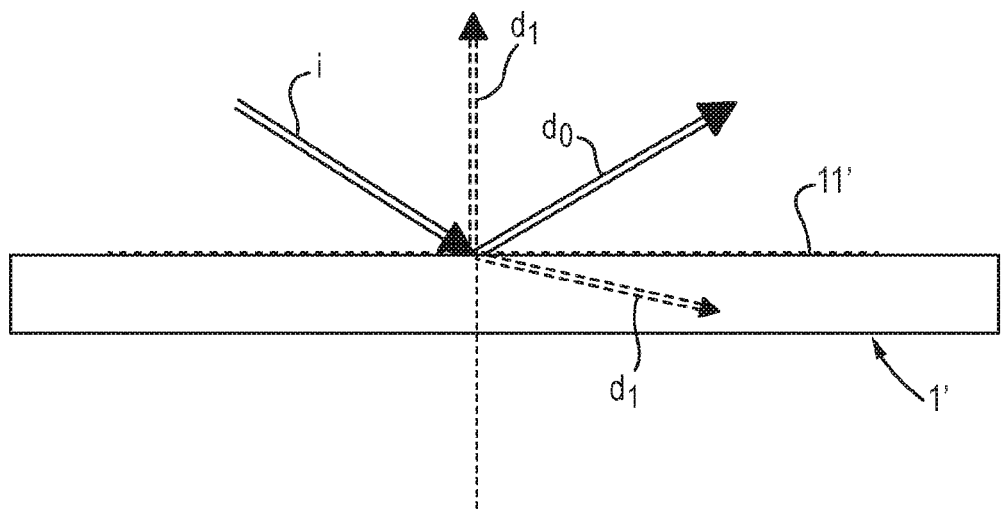
FIGS. 14A and 14B show, schematically, a diffraction grating not according to the invention in cross-section in two different illumination conditions.
Figure 14B:
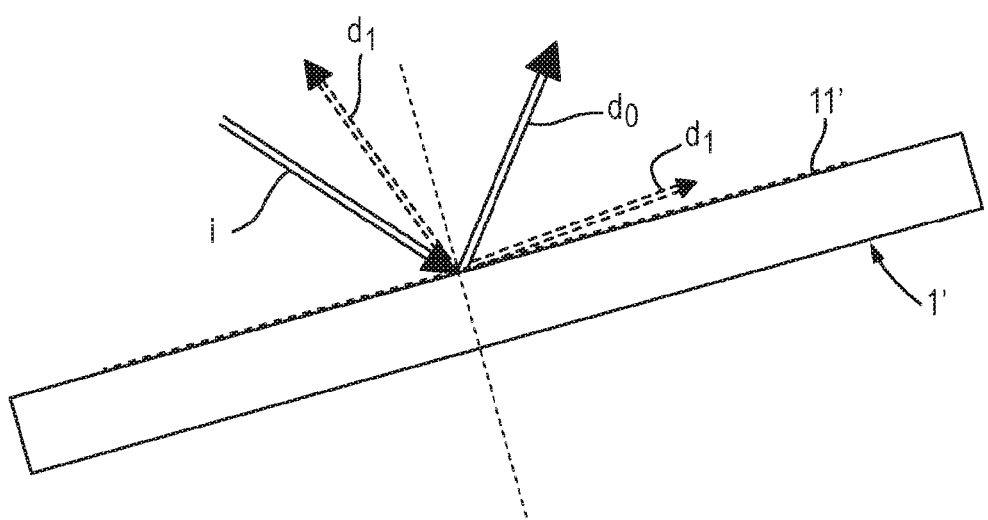

FIGS. 14A and 14B illustrate the behaviour of a diffraction grating to aid with the understanding of the embodiment of FIG. 15. These Figures shows a security element not of the invention comprising a diffraction grating 11' arranged on a planar surface of a security element 1'. In FIG. 14A, the security element is arranged horizontally and light is incident on the surface of the grating along direction i, which is an angle away from normal to the surface. The zero order $d_0$ is shown corresponding to the direction of specular reflection. Two first orders are shown $d_1$ either side of the zero order $d_0$. Here, the first order is relatively far removed from the zero order, as may be the case for nano-gratings with a pitch of 600 nm or less. One of the first order directions is shown as being directed into the body of the security element on which the grating is arranged. This corresponds to a diffractive order that will not be exhibited in the current arrangement. The remaining first order is diffracted back away from the security element and in this case, along a direction normal to the surface. FIG. 14B shows the security element rotated about an axis along which the grating elements extend, but with the direction of illumination remaining fixed. This demonstrates that this inclination of the grating element moves the position of the first diffraction orders about the axis of rotation. The embodiment of FIG. 15 utilises inclination of sub-regions of the security device to alter the angle of incidence and hence alter the direction of the diffractive orders.

Figure 15A:
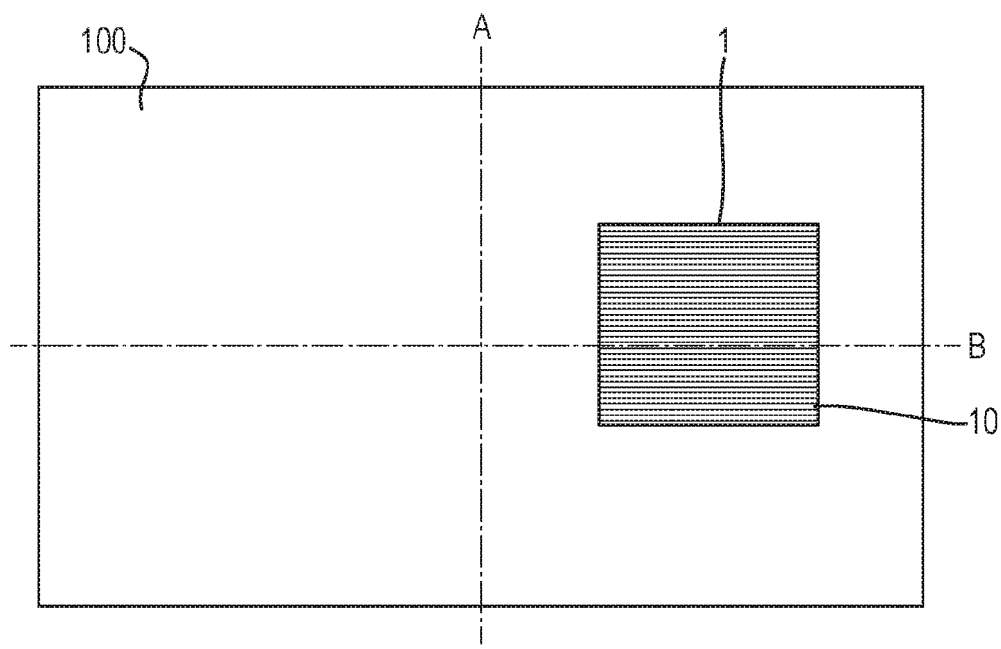
FIGS. 15A to 15C show, schematically, a security document according to a sixth embodiment and enlarged portions of the security element according to the sixth embodiment in an enlarged perspective view and in plan view showing the diffractive structures respectively.

FIG. 15A shows a security document 100, again a banknote, with a security element 1. The security document has a short axis A and a long axis B perpendicular to the short axis. The security element has a first surface that faces away from the security document. This first surface is made up of an array of image regions 10, in this case elongate image regions, each elongate image region extending in a first direction, but this time along the direction of the axis B. The array of elongate image regions are arranged so as to repeat along a second direction along the surface, this time along the direction of axis A, the image regions repeating so as to provide the height of the security element.

Figure 15B:
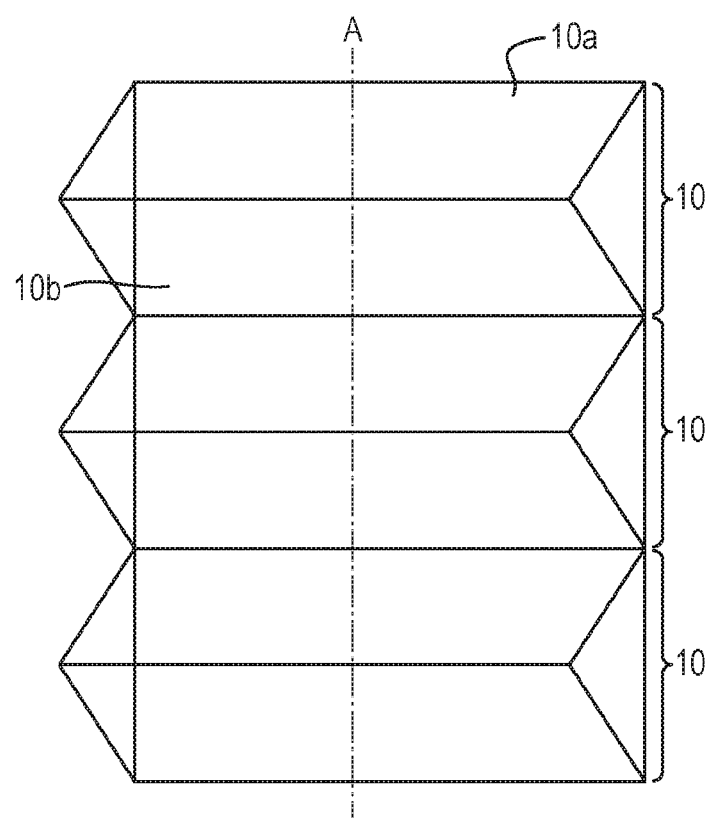

FIG. 15B shows a small area of the security element, illustrating the arrangement of the surface of the security element across three image regions 10 in a perspective view. Here the surface is essentially the same as in, for example, FIG. 3A, but rotated through 90° so that the image regions extend horizontally. In more detail, each image region has an elongate triangular prism shape, providing each image region with two facets facing away from the security document. The triangular prism is elongated along the direction of axis B and has substantially constant cross-section as viewed along the direction of axis A. FIG. 15B shows only three image regions 10, but it will be appreciated that many more are typically used to make up the full security element. Each image region 10 has a respective first sub-region 10a, being a facet that is inclined away from being parallel with the security document so as to face slightly upwards. Each first sub-region 10a across the image regions 10 has substantially the same inclination such that the first sub-regions all have the same effect on the angle of incidence of light. Each image region also has a respective second sub-region 10b, being a facet that is inclined away from being parallel with the security document so as to face slightly downwards. Again, all inclinations are substantially the same for each second sub-region 10b.

Figure 15C:
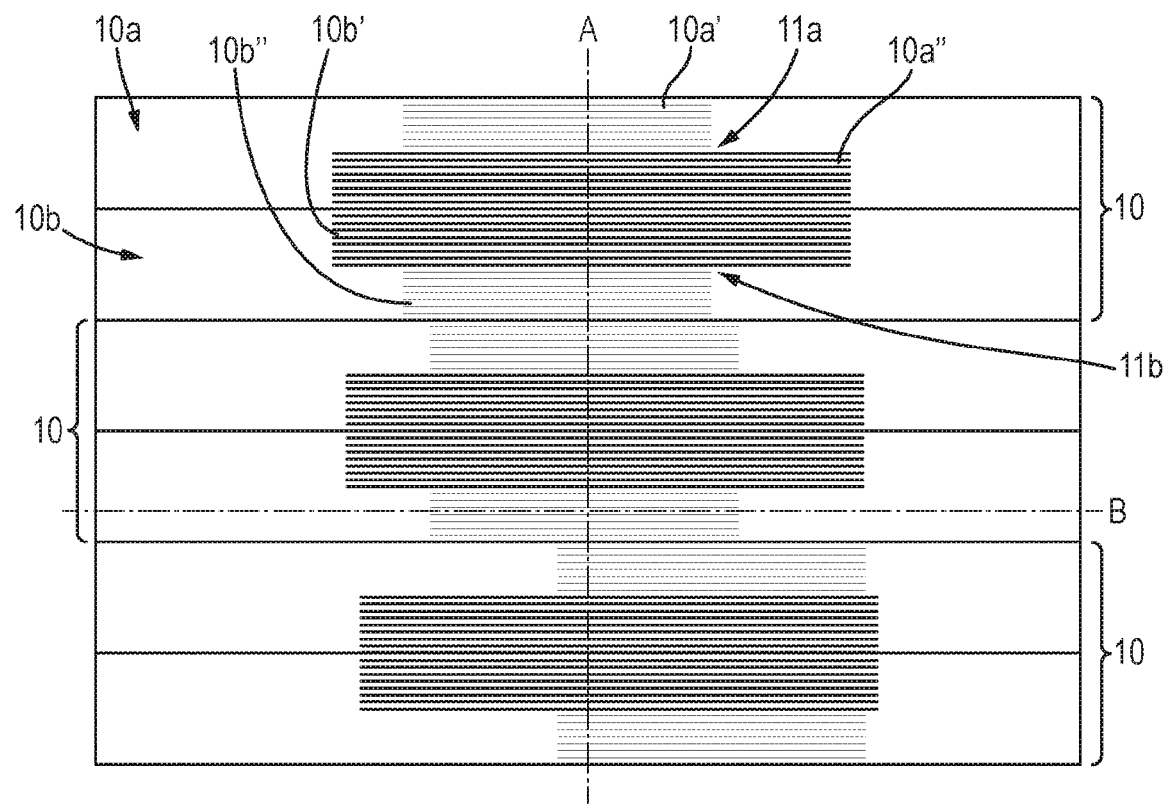

FIG. 15C shows in plan view the same small area of the security element shown in FIG. 15B. This illustrates the arrangement of diffraction gratings 11a and 11b across the first and second sub-regions 10a, 10b respectively. As shown, the diffraction gratings are provided so that their elements extend along the direction of axis B, i.e. so that the diffractive plane is substantially vertical. Each diffraction grating 11a, 11b has primary areas 10a', 10b' with grating having a first pitch and secondary areas 10a", 10b" with grating having a second pitch such that the two areas exhibit different colours. In the present example, the first and second areas of each sub-region define substantially the same image by the arrangement of the primary and secondary areas, but with the pitches of the grating structures reversed.

Figure 16A:
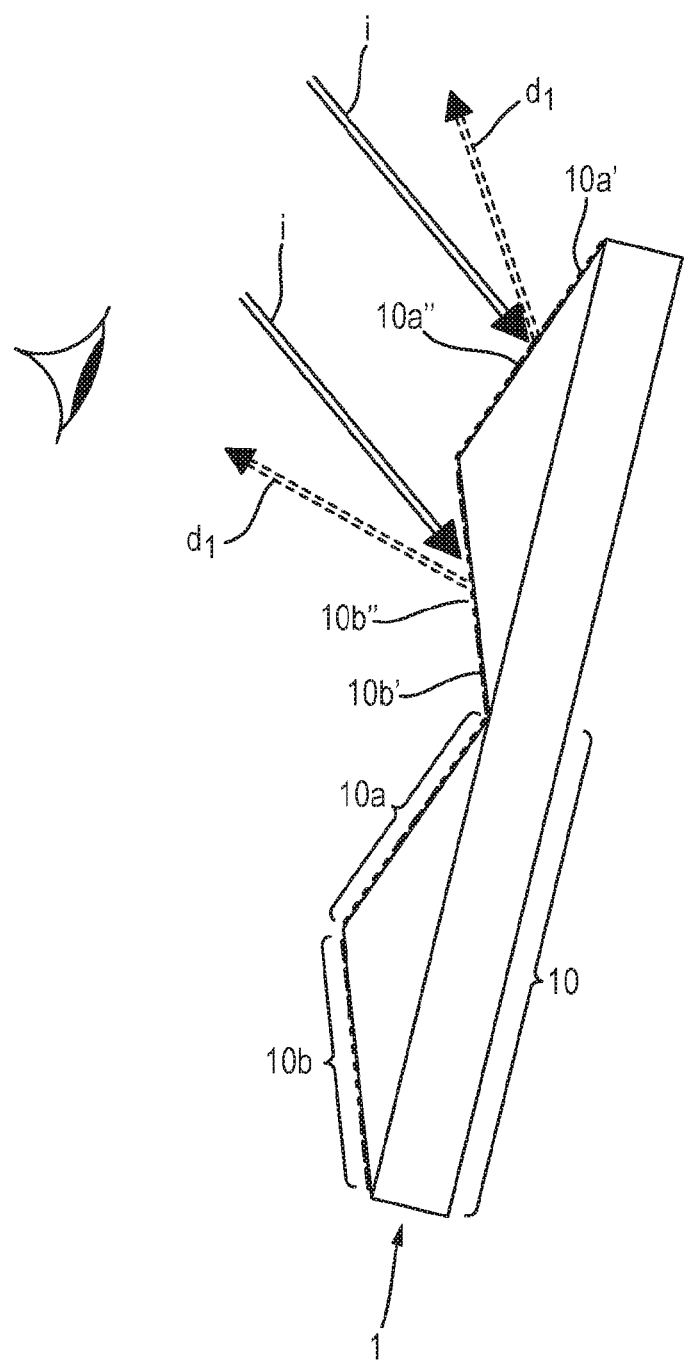
FIGS. 16A and 16B show, schematically, cross-sectional views of the security element according to the sixth embodiment in two different viewing arrangements.
Figure 16B:
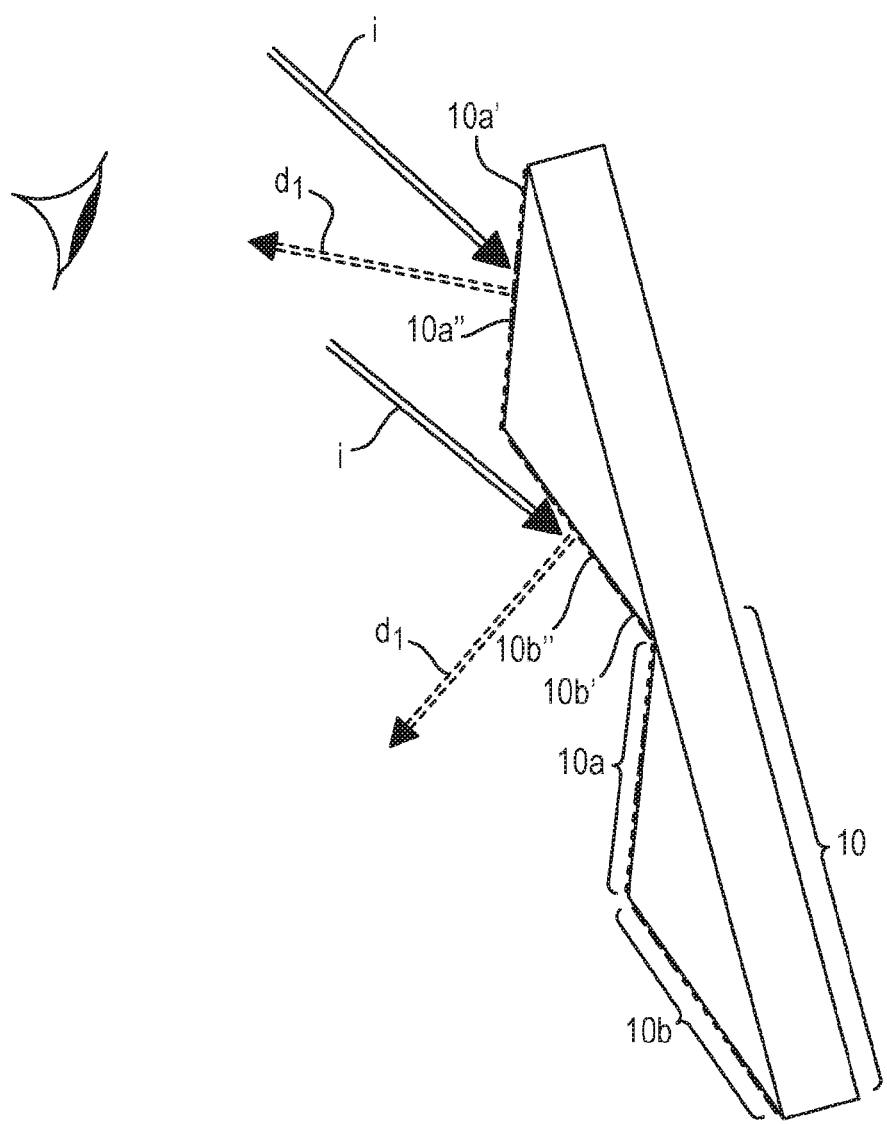

FIGS. 16A and 16B show, schematically, the security element in cross-section in two different viewing arrangements. These Figures show that, when the security element is rotated so that the top is further from the viewer than the bottom, the diffractive effect exhibited by the second diffraction grating 11b in the second sub-regions 10b is exhibited to the viewer (only one first diffraction order $d_1$ from grating 11b is shown for clarity) and when the security element is rotated so that the top is closer to the viewer than the bottom, the diffractive effect exhibited by the first diffraction grating 11a in the first sub-regions 10a is exhibited to the viewer (again only one diffraction order $d_1$ from grating 11a is shown for clarity). Here, the viewer sees an image switch upon rotation of the security element in this manner owing to the reversal of the primary and secondary areas between the first and second sub-regions. The viewer may also see a change in diffractive colour from each grating as the security element is rotated. The precise effect will, of course, be configurable by the grating parameters and the inclinations of the sub-regions.

Figure 17:
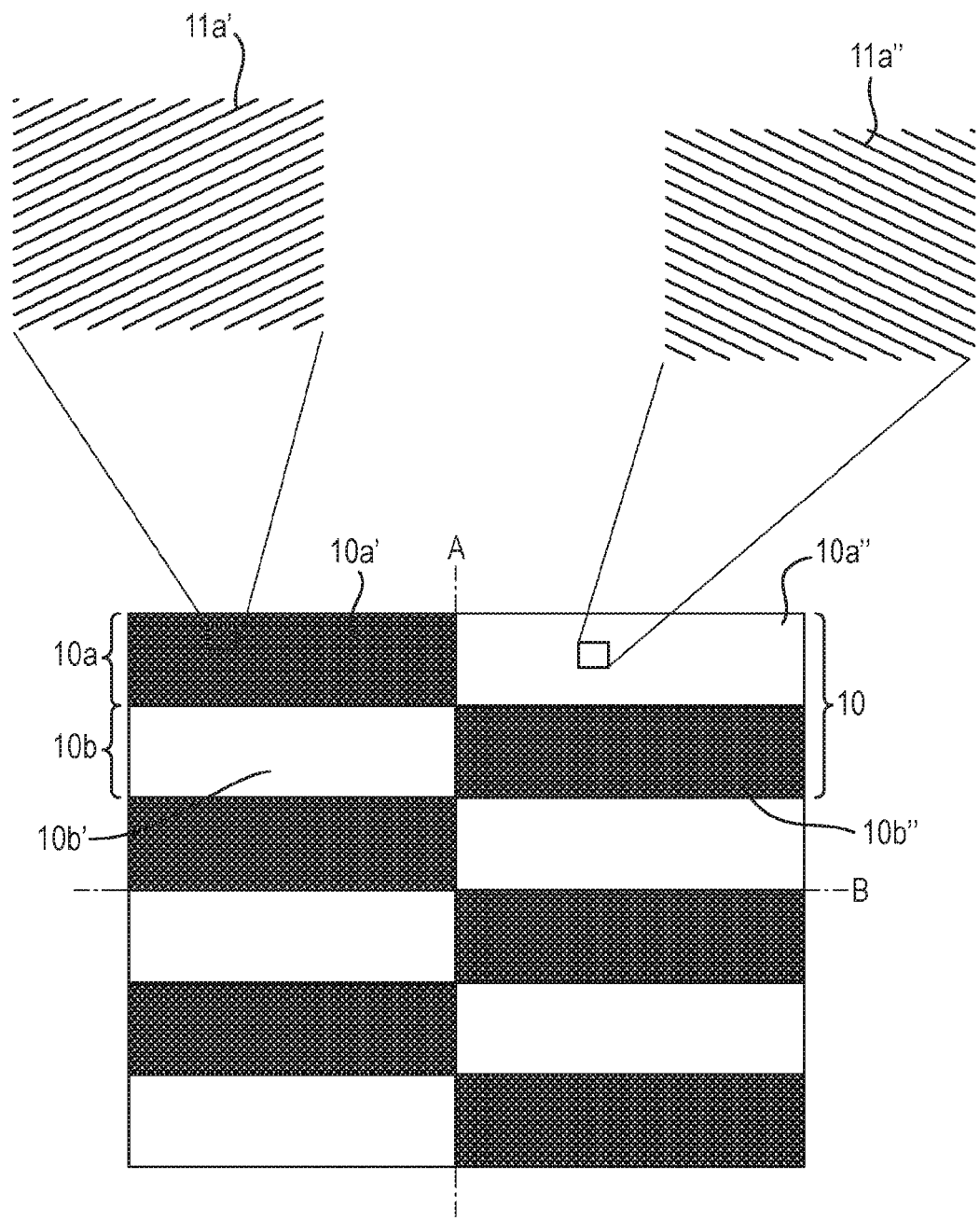
FIG. 17 shows, schematically, an enlarged portion of a security element according to a seventh embodiment of the invention.

In the above embodiment, the gratings are arranged so as to be parallel with the axis B. However, it may be desirable to introduce optical variability also in a direction of rotation of the security element about axis A. One way to do this is to provide the first and or second regions with diffraction grating whose orientation is varied away from being parallel with the axis B. FIG. 17 illustrates an implementation of this as a variation of the previous embodiment. FIG. 17 shows in schematic plan view a small portion of the security element 1 with horizontally extending image regions 10 and, shows specifically three image regions 10, each with first and second sub-regions 10a, 10b. The first and second sub-regions are each provided with primary areas 10a', 10b' and secondary areas 10a", 10b", which may be interlaced along each sub-region or may be spatially arranged in accordance with an image. The grating 11a' in the primary areas 10a' has an orientation rotated anti-clockwise by less than 45° relative to axis B and the grating 11a" in the secondary areas 10a" has an orientation rotated clockwise by less than 45° relative to axis B. The gratings may optionally be provided with different pitch. In such an embodiment, rotating about axis B switches between the first and second sub-regions in accordance with the inclination of the sub-regions and rotating about axis A switches between the primary and secondary areas in accordance with the grating orientation.

The above embodiments have focussed on one-dimensional arrays of image regions in which the inclinations of the sub-regions contribute to variability in the direction of rotation about axis A. However, in other embodiments, two-dimensional arrays of image regions may be used and some of these will now be described.

Figure 18:
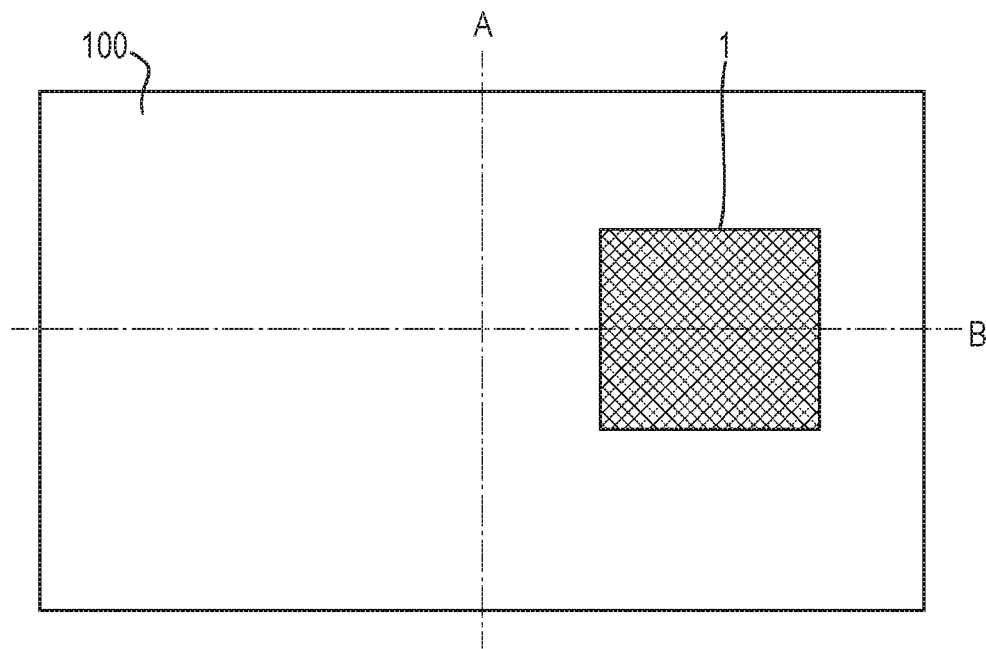
FIG. 18 shows, schematically, a security document including an eighth embodiment of a security element.
Figure 19A:
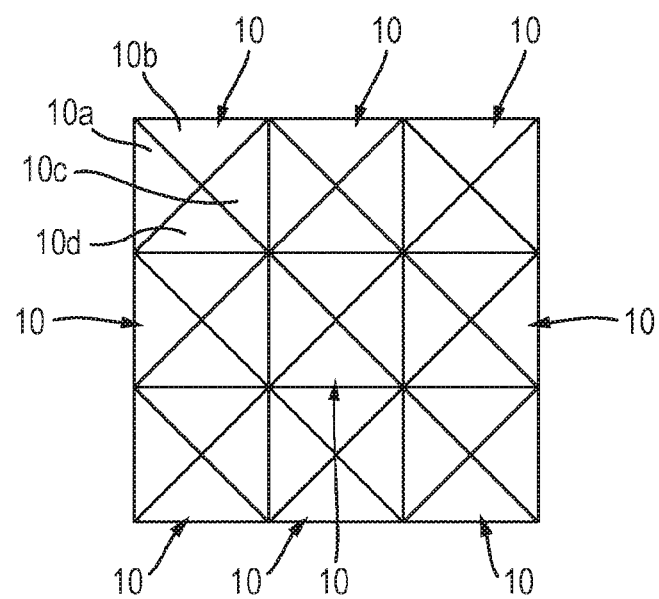
FIGS. 19A, 19B and 19C show, schematically, enlarged portions of the security element according to the eighth embodiment in a first plan view, in a perspective view, and in a plan view showing the diffractive structures on the surface.
Figure 19B:
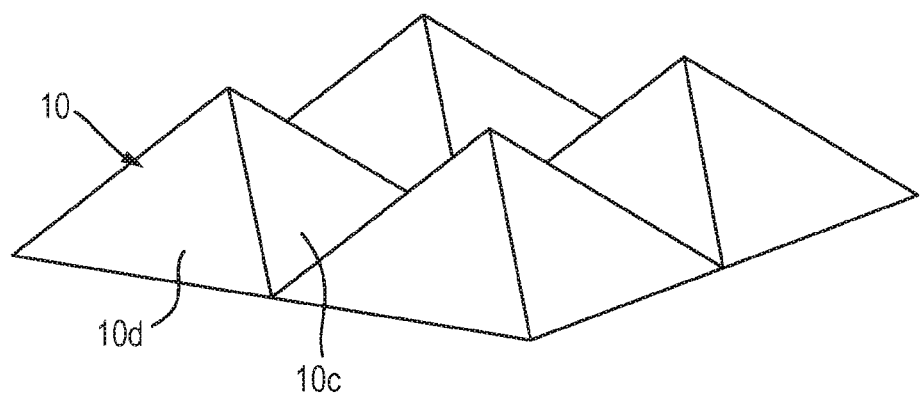
Figure 19C:
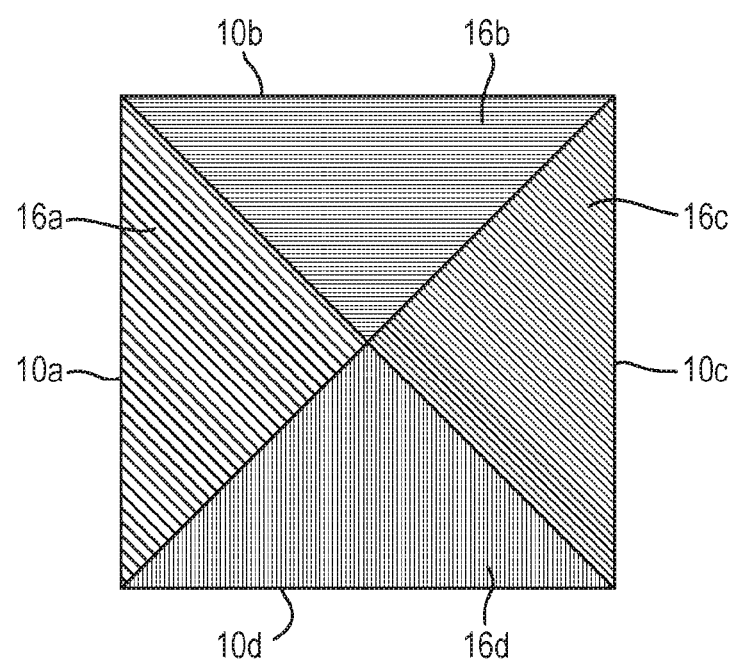

FIG. 18 shows a security document 100, again a banknote, with a security element 1. The security document has a short axis A and a long axis B perpendicular to the short axis. The security element has a first surface that faces away from the security document. This first surface is made up of a two-dimension array of image regions 10. The image regions are shown in more detail in FIGS. 19A to 19C. In this case, each image region is shaped as a square based pyramid such that each image region 10 has four facets providing four different sub-regions 10a, 10b, 10c, 10d. Again, it should be appreciated that the angle of inclinations of these facets shown in the Figures is schematic and the inclinations used will be selected for the desired effect on the effective angle of incidence of light. As shown in FIG. 19C, each sub-regions 10a, 10b, 10c, 10d is provided with a corresponding diffraction grating 16a, 16b, 16c, 16d. In this embodiment, the diffraction gratings used are zero-order diffraction gratings, which provide a diffractive colour effect only in the direction of specular reflection. When this security document is viewed, the security element will exhibit a diffractive effect at four different viewing angles as a result of the different facets in each image region 10 changing the angle at which light is incident between the four different sub-regions 10a, 10b, 10c, 10d. These four different viewing angles will be separated by rotation about both axis A and B, providing the security element with optical variability in two orthogonal directions of rotation.

Again, the above embodiment describes each 10a, 10b, 10c, 10d of each image region 10 as being entirely filled with the respective diffraction grating. However, in many embodiments, the diffraction gratings will be selectively provided in certain sub-regions across the security element such that, when the diffractive effect is visible, an image is presented to the viewer. Additionally, more than one type of diffraction grating could be provided in any of the first, second, third or fourth sets of sub-regions to provide, for example, multi-coloured effects.

The above example describes the use of zero order diffraction gratings; however, it will be appreciated that other gratings, such as first order gratings, could be used. For example, respective first order gratings may be used with grating parameters, such as orientation, pitch and profile, configured in combination with the sub-region inclinations to give the desired replay angles.

Figure 20:
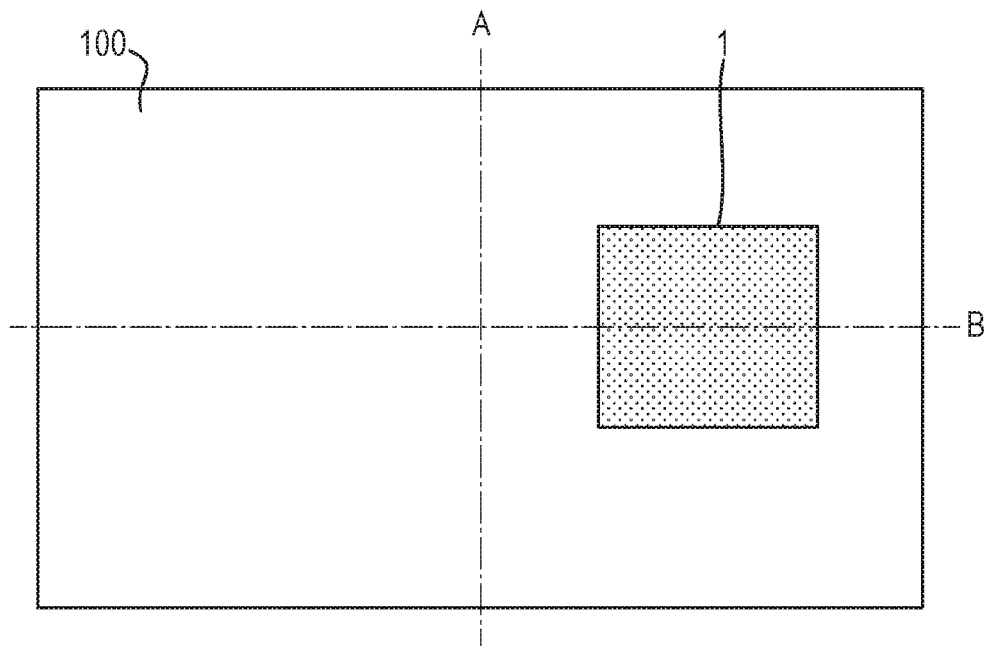
FIG. 20 shows, schematically, a security document including a ninth embodiment of a security element.
Figure 21A:
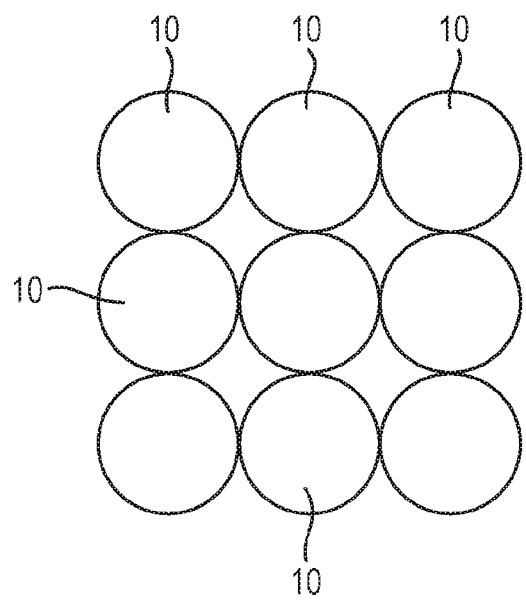
FIGS. 21A, 21B and 21C show, schematically, enlarged portions of the security element according to the ninth embodiment in a first plan view, in a perspective view, and in a plan view showing the regions over which diffractive structures may be arranged.
Figure 21B:
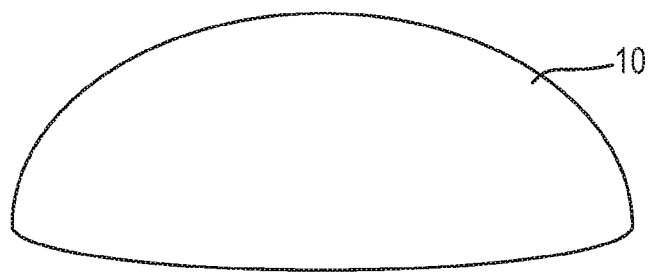
Figure 21C:
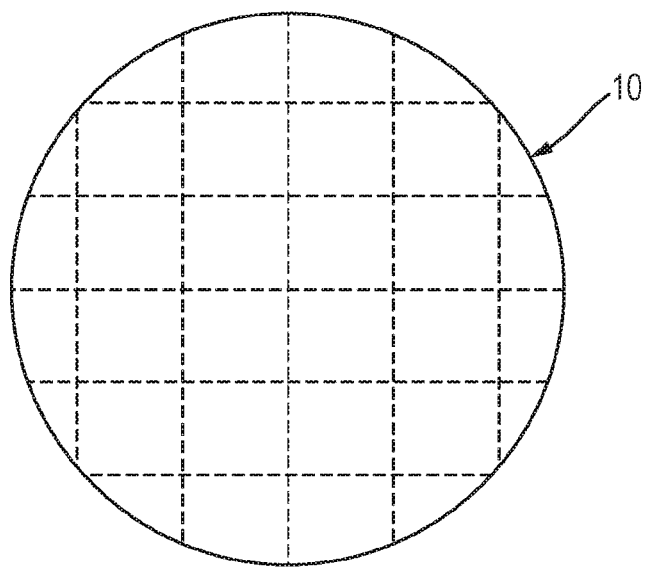

FIG. 20 shows another security document 100, again a banknote, with a security element 1. The security element in this embodiment comprises a two-dimensional array of convex dome shaped image regions 10, which are substantially circular in plan view, as shown in FIG. 21A. Here, the image regions 10 repeat along two orthogonal directions of the security element. A single image region 10 is shown in perspective view in FIG. 21B, omitting the diffractive structures. It can be seen here that since each individual image region is dome shaped, it is convex along the two orthogonal directions along which the image regions repeat. FIG. 21C shows a single image region 10 divided into a number of sub-regions. In this embodiment, a simple square array of sub-regions is provided in each image region 10; however, it will be appreciated that the image region may be divided up in other ways, depending on the average inclinations desired for particular regions. Here, the sub-regions are interlaced along the same two orthogonal directions along which the image regions repeat and each sub-region will thereby have a unique average inclination with respect to the plane of the security element as a result of the image region being convex along both orthogonal directions. While not shown in this embodiment, these sub-regions may then be assigned corresponding diffraction gratings for producing effects by the mechanisms described above, i.e. using the replay angles of the diffraction gratings together with the average inclination of the sub-regions to achieve diffractive replay at the desired viewing angles. For example, each sub-region may be provided with a zero order diffraction grating that exhibits a rotational colourshift as has been described above. The zero order diffraction gratings should provide that, within each image region, each sub-region carries a corresponding portion of a respective image. The resulting security element will exhibit a series of different images as it is tilted along two orthogonal directions in accordance with the local surface normal across the sub-regions, since zero order diffractive devices exhibit their effect in the direction of specular reflection. For example, a top-left sub-region within each image region may carry a corresponding portion of a first image, such that when the security element is arranged such that incident light is reflected from each of these top-left sub-regions towards the viewer, the first image will be visible as a result of the combined appearance of these top-left sub-regions across the element. The same will be true of each of the other sets of sub-regions at their own corresponding viewing angles. In other words, each image region will effectively display a respective pixel of one of the images in accordance with the viewing angle such that each of the images is visible across the security device over the respective viewing angle ranges.

Another implementation of a two dimensional array of image regions will now be discussed with reference to FIGS. 22 to 24.

Figure 22:
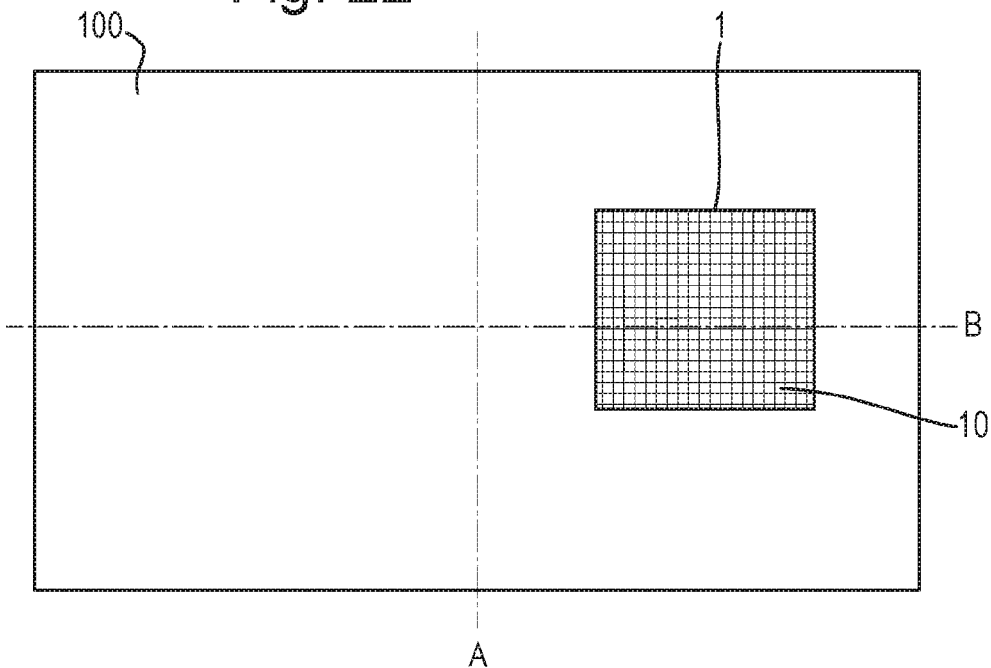
FIG. 22 shows, schematically, a security document including a tenth embodiment of a security element.

FIG. 22 shows a security document 100, again a banknote, with a security element 1. The security document has a short axis A and a long axis B perpendicular to the short axis. The security element has a first surface that faces away from the security document. This first surface is made up of a two-dimension array of image regions 10. Each image region is substantially rectangular in shape in plan view. The image regions repeat along the directions of both axes A and B in a regular arrangement.

Figure 23:
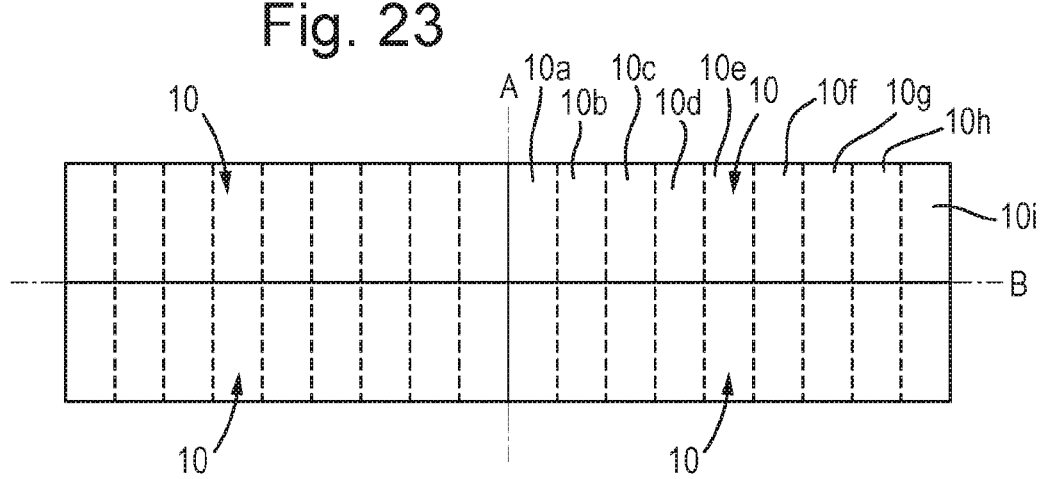
FIG. 23 shows, schematically, an enlarged portion of the security element according to the tenth embodiment in plan view.

FIG. 23 shows four image regions 10 of the array of image regions in plan view and illustrates that it is composed of nine sub-regions 10a-10i arranged along the direction of axis B. Each sub-region is provided with a respective diffractive structure (not shown) which is preferably a diffraction grating having grating element also extending along the direction of axis B. As with the above embodiments, the gratings may be modulated or spatially arranged in accordance with a respective one of nine images carried by the respective sets of sub-regions 10a-10i.

Figure 24:
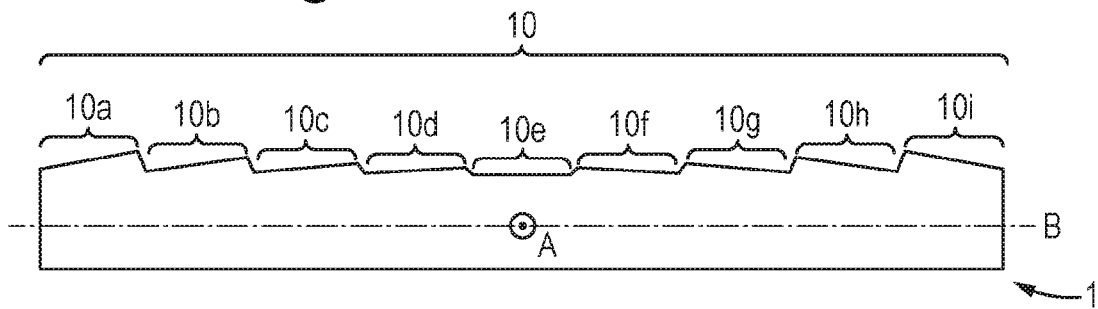
FIG. 24 shows, schematically, a cross-sectional view through a portion of the security element of the tenth embodiment.

FIG. 24 shows a single image region 10 in cross-section along the direction of axis B revealing the inclination of the nine sub-regions 10a-10i. It will be noted that in this embodiment the inclinations are substantially invariant along the direction of axis A. As shown, each sub-region differs from each other sub-region in the angle it makes to the plane of the security element about a direction of the axis A (this direction being the "image region axis" referred to above). Specifically, the central sub-region 10e is substantially parallel with the plane of the security element. Those sub-regions to the left of the central sub-region are each inclined towards a viewer's left, with the angle of inclination increasing away from the central sub-region. Similarly, the sub-regions to the right of the central sub-region are each inclined towards a viewer's right, with the angle of inclination increasing away from the central sub-region. It should be noted here that the order of the sub regions is not important, provided one sub-region is provided with each inclination in each image region. The order of the sub-regions may even vary from one image region to the next, in particular where the pitch of the image regions is smaller than that perceptible by the naked eye, since a viewer will not typically be able to identify where any image "pixel" is originated within each image region.

When the security document of FIG. 22 is viewed and rotated about the axis A, different ones of the sub-regions 10a-10i will exhibit their optical effect (i.e. the diffractive effect of the grating carried in those sub-regions) owing to the inclinations of those sub-regions. If the security device is rotated about axis B when any one set of sub-regions is exhibiting its diffractive effect, this may cause the corresponding diffraction grating to exhibit a colour shift as the diffractive colours are cycled through.

FIG. 25 illustrates an alternative arrangement of image regions. Here we have again a two-dimensional array of substantially rectangular shaped image regions 10. The dotted lines in FIG. 25 illustrate repetitions of the image regions 10 that is not shown. Each image region 10 comprises a two-dimensional array of sub-regions 10a-10r. In this case, the sub-regions are arranged along the same two directions as the image regions 10. That is, the sub-regions within one region are arranged along the directions of axes A and B. There are 18 sub regions in total in the present embodiment, arranged in two rows. As with the previous embodiment, each sub-image region differs from each other sub-region in the angle it makes to the plane of the security element about a direction of the axis A. Again, the order is not crucial, however in this embodiment, the two sub-regions making up the leftmost column are those inclined most towards the viewer's left, with the first sub-region 10*a* being more leftwardly inclined than the second sub-region 10*b*, while those two sub-regions making up the rightmost column are those most inclined towards the viewers right, again with the last sub-region 10*r* being more rightwardly inclined than the penultimate sub-region 10*q*. The sub-regions in the columns between represent the inclinations between these two extremes.

Figure 26A:
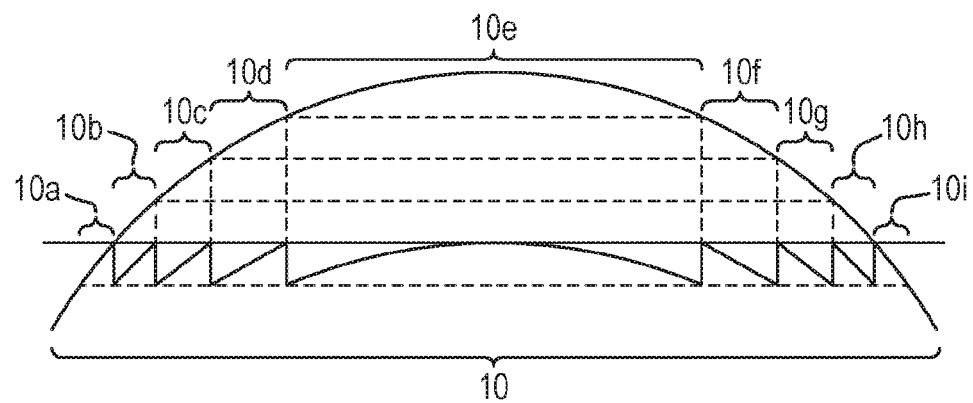
FIGS. 26A, 26B and 26C show, schematically, first and second side views of a portion of a security element according to an thirteenth embodiment and a plan view showing the regions over which diffractive structures may be arranged.
Figure 26B:
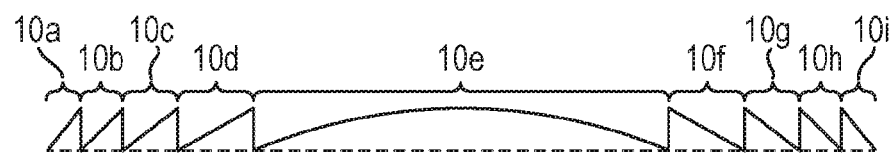
Figure 26C:
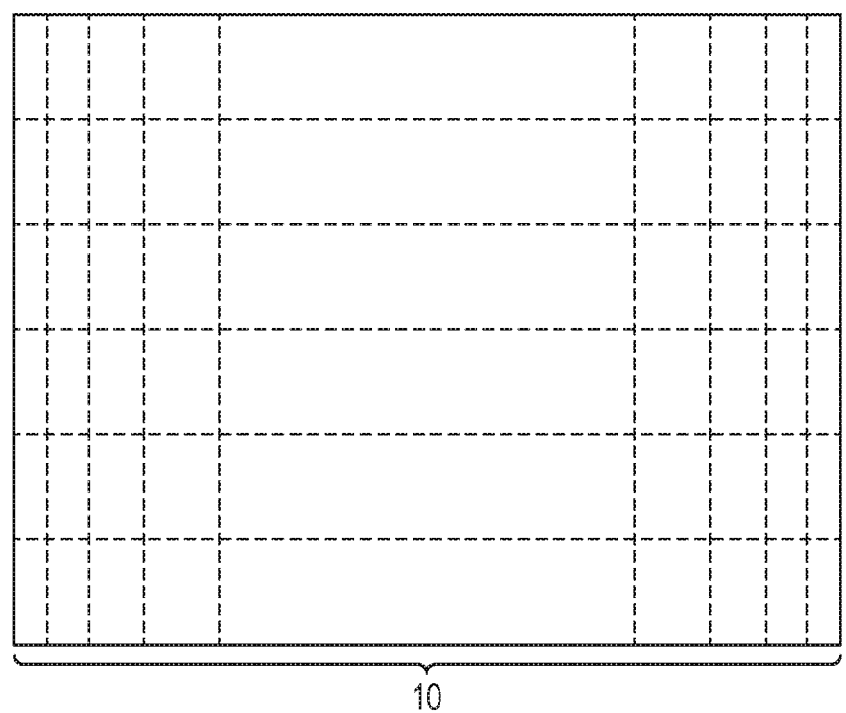

Again, when this security element is viewed and rotated about the axis A, different ones of the sub-regions will exhibit their optical effect owing to the inclinations of those sub-regions. If the security device is rotated about axis B when any one set of sub-regions is exhibiting its diffractive effect, this may cause the corresponding diffraction grating to exhibit a colour shift as the diffractive colours are cycled through. This embodiment has the advantage that more sub-regions can be used without requiring the sub-regions to individually be so narrow that the approach the diffraction limit or become difficult to manufacture. A further shape of image region is shown in FIGS. 26A to 26C. Here, each image region 10 is formed as a diverging Fresnel mirror. This shape may be elongate for a one-dimensional array or circular in plan view for a two-dimensional array and emulates the effect produced by either the semi-cylindrical region of the embodiment of FIGS. 9 to 11 or the convex dome of FIGS. 21A to 21C. In this embodiment, the Fresnel structure is elongate, i.e. it has constant cross-section, the cross-section being shown in FIGS. 26A and 26B. Essentially, the surface comprises a series of facets that each have the same shape as a corresponding portion of the surface of a semi-cylinder or semi-sphere. However, these facets are provided at substantially the same level, reducing the thickness of the structure as compared with an equivalent semi-cylinder or semi-sphere. In this embodiment, 9 facets are provided and each facet is used for corresponding sub region 10*a* to 10*i*. FIG. 26C shows the structure in plan view, and shows each sub-region 10*a* to 10*i*, divided into areas, substantially as described in relation to the embodiment of FIGS. 9 to 11.

Figure 27A:
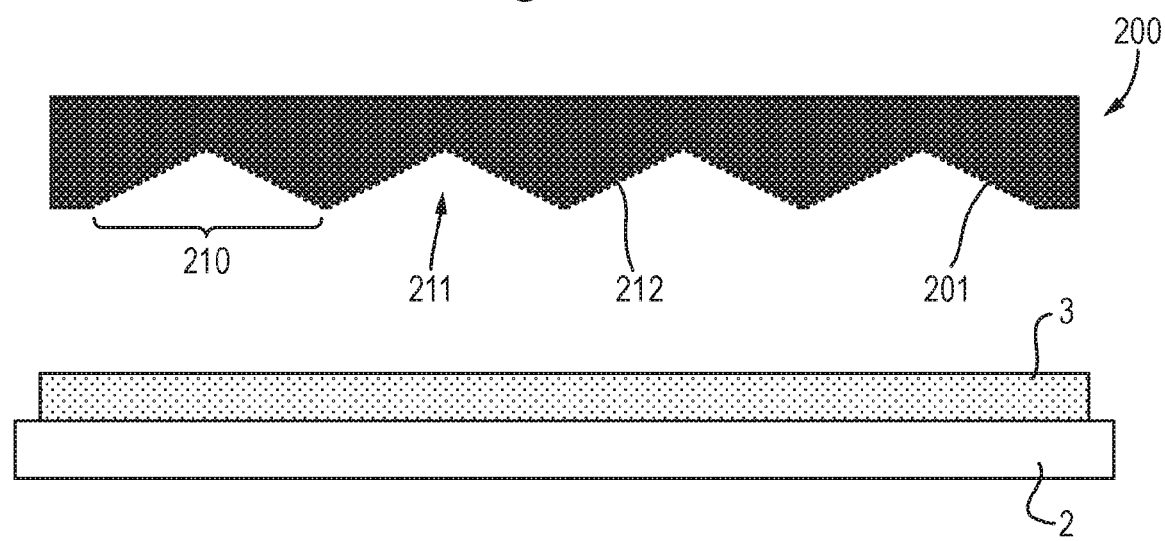
FIGS. 27A to 27D show, schematically, four different stages during a method of manufacture of the security element of the first embodiment.

The above structures may be formed using a cast-cure process and such a process is illustrated in FIGS. 27A to 27D. The surface structure, including both the coarse image region surface structure providing the inclinations of the sub-regions and the diffractive relief structures can be provided in a master die, for example by using e-beam lithography. FIG. 27A shows a master die 200 with a negative of the desired surface structure 201. This surface structure in the die defines negatives of array of image regions 210, including the grating structure 212 and the coarse prismatic structure 211. FIG. 27A also shows a transparent support layer 2, which may be a layer of the final security element 1. On the surface of the transparent support layer 2 is provided a UV curable material 3. In alternative embodiments, the curable material 3 is directly applied onto the security document and the surface relief subsequently formed in the surface of the curable material while on the security document. This alternative requires no subsequent transferral of the security element onto a security document. In yet further alternatives, the security element may be formed directly into the substrate of the security document by using a formable polymer substrate in place of the UV curable material 3.

Figure 27B:
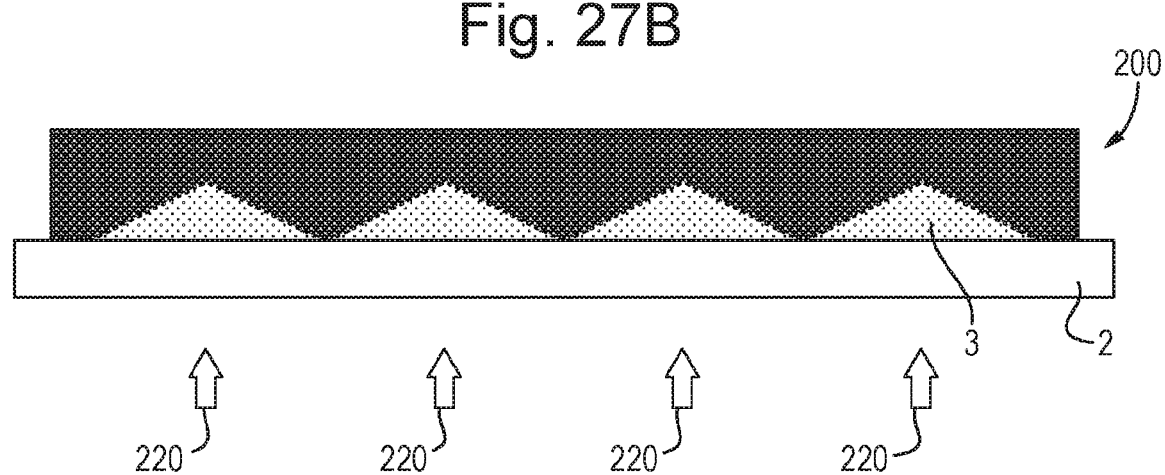

FIG. 27B shows the die 200 being brought into contact with the curable material 3 so as to form the curable material into the desired surface shape, i.e. into a series of prismatic elements with diffraction grating structures provided on the facets. FIG. 27B also illustrates that the curable material 3 is exposed to UV radiation 220 through the transparent support layer 2, while in contact with the die 200.

Figure 27C:
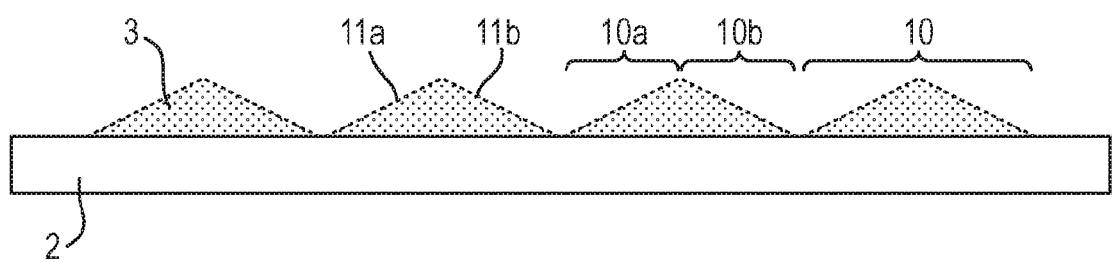

FIG. 27C shows the cured curable material 3, which corresponds to the first layer of the security element discussed above, after separation from the die 200. The cured curable material now exhibits a plurality of image regions 10 with corresponding sub-regions 10*a*, 10*b* and respective diffraction gratings 11*a*, 11*b*, as described above in FIGS. 1 to 4B.

Figure 27D:
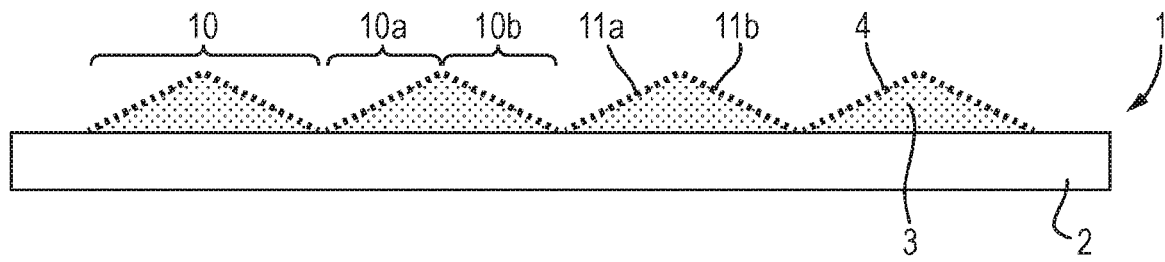

FIG. 27D shows a cross section of the final security element 1 after the surface has been coated in a reflection enhancing layer 4, in this case a conformal coating of an opaque metal. The reflection enhancing layer may be formed on the surface of the security element using a vapour deposition process, for example. As can be seen here, the security element comprises the layer of cured curable material 3 whose surface carries array of image regions 10, each having first and second sub-regions 10*a*, 10*b*, and each sub-region including first and second diffraction gratings 11*a*, 11*b*.

Security elements of the sorts described above are suitable for forming on security articles such as threads, stripes, patches, foils and the like which can then be incorporated into or applied onto security documents such as banknotes. The security elements can also be constructed directly on security documents, such as polymer banknotes.

Security elements of the sorts described above can be incorporated into or applied to any product for which an authenticity check is desirable. In particular, such devices may be applied to or incorporated into documents of value such as banknotes, passports, driving licences, cheques, identification cards etc. The security element can either be formed directly on the security document (e.g. on a polymer substrate forming the basis of the security document) or may be supplied as part of a security article, such as a security thread or patch, which can then be applied to or incorporated into such a document. The security element may be applied to a security document, for example by using a pressure sensitive adhesive.

Such security articles can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travellers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP 0059056 A1. EP 0860298 A2 and WO 03095188 A2 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

Base substrates suitable for making security substrates for security documents may be formed from any conventional materials, including paper and polymer. Techniques are known in the art for forming substantially transparent regions in each of these types of substrate. For example, WO 8300659 A1 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security element or a separate security element can be applied to the transparent substrate of the document. WO 0039391 A1 describes a method of making a transparent region in a paper substrate.

The security element may also be applied to one side of a paper substrate, optionally so that portions are located in an aperture formed in the paper substrate. An example of a method of producing such an aperture can be found in WO 03054297 A2. An alternative method of incorporating a security element which is visible in apertures in one side of a paper substrate and wholly exposed on the other side of the paper substrate can be found in WO 2000/39391 A1.

The security element of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

Particularly in embodiments in which the diffractive relief structures are metallised, e.g. in which the diffraction gratings are coated in an opaque metal layer, the security element can be used to conceal the presence of a machine readable dark magnetic layer, for example, provided between the curable material and the transparent support in the embodiment of FIG. 19. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

The invention claimed is:

1. A security element comprising:
a first layer having a first surface coated in a reflection enhancing layer;
an array of image regions across the first surface, each image region comprising at least a first sub-region and a second sub-region, wherein the array of image regions comprises an array of elongate image regions, each elongate image region extending in a first direction along the first surface, the array of elongate image regions being arranged along a second direction along the first surface substantially perpendicular to the first direction along the first surface;
a first diffractive optically variable effect generating structure provided in or on the first surface across the first sub-regions, wherein the first diffractive optically variable effect generating structure is a dispersive structure; and
a second diffractive optically variable effect generating structure provided in or on the first surface across the second sub-regions, wherein the second diffractive optically variable effect generating structure is a dispersive structure;
wherein the first surface is arranged such that each first sub-region has a first average inclination and such that each second sub-region has a second average inclination different from the first average inclination,
wherein the first diffractive optically variable effect generating structure and the first average inclination provide that the first optically variable effect is exhibited across the first sub-regions at least at a first viewing angle and the second diffractive optically variable effect generating structure and the second average inclination provide that the second optically variable effect is exhibited across the second sub-regions at least at a second viewing angle different from the first viewing angle,
wherein the first average inclination differs from the second average inclination about an image region axis parallel with the first direction along the first surface, and
wherein the first and second diffractive optically variable effect generating structures are oriented such that diffractive elements of the first and second diffractive optically variable effect generating structures extend along respective directions that are at least 45° from the image region axis.

2. The security element according to claim 1, wherein the array of image regions comprises a regular array of image regions.

3. The security element according to claim 1,
wherein the first diffractive optically variable effect generating structure and the first average inclination provide that the first optically variable effect is exhibited across the first sub-regions over a first range of viewing angles, and
wherein the second diffractive optically variable effect generating structure and the second average inclination provide that the second optically variable effect is exhibited across the second sub-regions over a second range of viewing angles different from the first range of viewing angles.

4. The security element according to claim 1, wherein the first diffractive optically variable effect generating structure is provided in or on the first surface across the first sub-regions such that a first image is displayed by the first sub-regions in combination at least at the first viewing angle.

5. The security element according to claim 4,
wherein the first diffractive optically variable effect generating structure is provided across the first sub-regions and spatially arranged and/or modulated across the first sub-regions in accordance with the first image such that the first image is displayed by the first sub-regions in combination at least at the first viewing angle, and
wherein the second diffractive optically variable effect generating structure is provided across the second sub-regions and spatially arranged and/or modulated across the second sub-regions in accordance with a second image such that the second image is displayed by the second sub-regions in combination at least at the second viewing angle.

6. The security element according to claim 1, wherein the first surface is arranged such that the first and second optically variable effects are exhibited at different viewing angles in a direction of rotation of the security element about the first direction.

7. The security element according to claim 6, wherein at least the first and/or second diffractive optically variable effect generating structure has a pitch, orientation and size, shape and/or profile of the elements of the structure configured such that the first/or second diffractive optically variable effect generating structure exhibits optical variability upon rotation of the security element about the second direction.

8. The security element according to claim 1,
wherein the first sub-regions comprise an array of primary areas and an array of secondary areas, wherein the first diffractive optically variable effect generating structure comprises a primary diffractive optically variable effect generating structure provided across the primary areas and a secondary diffractive optically variable effect generating structure provided across the secondary areas, and
wherein the primary diffractive optically variable effect generating structure differs from the secondary diffractive optically variable effect generating structure in at least one of the pitch of the structure, the orientation of the structure and the size, shape and/or profile of the elements of the structure such that the primary and secondary areas appear different at least at the first viewing angle.

9. The security element according to claim 8, wherein each first sub-region comprises an array of primary areas and an array of secondary areas, the primary and secondary areas being interlaced along the first direction and each primary and secondary area having substantially the same first inclination.

10. The security element according to claim 1, wherein the first surface is arranged so as to define a substantially convex surface element in each image region and wherein each first sub-region is a first sub-region of a corresponding substantially convex surface element and wherein each second sub-region is a second sub-region of a corresponding substantially convex surface element.

11. A method of manufacturing a security element comprising:
providing a first layer having a first surface coated in a reflection enhancing layer;
forming the first surface of the first layer so as to define an array of image regions across the first surface, each image region comprising at least a first sub-region and a second sub-region, wherein the first surface is formed such that each first sub-region has a first average inclination and such that each second sub-region has a second average inclination different from the first average inclination, wherein the array of image regions comprises an array of elongate image regions, each elongate image region extending in a first direction along the first surface, the array of elongate image regions being arranged along a second direction along the first surface substantially perpendicular to the first direction along the first surface;
providing a first diffractive optically variable effect generating structure in or on the first surface across the first sub-regions, wherein the first diffractive optically variable effect generating structure is a dispersive structure; and
providing a second diffractive optically variable effect generating structure in or on the first surface across the second sub-regions, wherein the second diffractive optically variable effect generating structure is a dispersive structure;
wherein the first diffractive optically variable effect generating structure and the first average inclination provide that the first optically variable effect is exhibited across the first sub-regions at least at a first viewing angle and the second diffractive optically variable effect generating structure and the second average inclination provide that the second optically variable effect is exhibited across the second sub-regions at least at a second viewing angle different from the first viewing angle,
wherein the first average inclination differs from the second average inclination about an image region axis parallel with the first direction along the first surface, and
wherein the first and second diffractive optically variable effect generating structures are oriented such that diffractive elements of the first and second diffractive optically variable effect generating structures extend along respective directions that are at least 45° from the image region axis.

12. A security element comprising:
a first layer having a first surface coated in a reflection enhancing layer;
an array of image regions across the first surface, each image region comprising at least a first sub-region and a second sub-region, wherein the array of image regions comprises an array of elongate image regions, each elongate image region extending in a first direction along the first surface, the array of elongate image regions being arranged along a second direction along the first surface substantially perpendicular to the first direction along the first surface;
a first diffractive optically variable effect generating structure provided in or on the first surface across the first sub-regions, wherein the first diffractive optically variable effect generating structure is a dispersive structure; and
a second diffractive optically variable effect generating structure provided in or on the first surface across the second sub-regions, wherein the second diffractive optically variable effect generating structure is a dispersive structure;
wherein the first surface is arranged such that each first sub-region has a first average inclination and such that each second sub-region has a second average inclination different from the first average inclination,
wherein the first diffractive optically variable effect generating structure and the first average inclination provide that the first optically variable effect is exhibited across the first sub-regions at least at a first viewing angle in a direction of rotation about the first direction and the second diffractive optically variable effect generating structure and the second average inclination provide that the second optically variable effect is exhibited across the second sub-regions at least at a second viewing angle in the direction of rotation about the first direction, different from the first viewing angle in the direction of rotation about the first direction,
wherein each first sub-region comprises an array of primary areas and an array of secondary areas, the primary and secondary areas being interlaced along the first direction and each primary and secondary area having substantially the same first inclination,
wherein the first diffractive optically variable effect generating structure comprises a primary diffractive optically variable effect generating structure provided across the primary areas and a secondary diffractive optically variable effect generating structure provided across the secondary areas, and wherein the primary diffractive optically variable effect generating structure differs from the secondary diffractive optically variable effect generating structure in at least an orientation of the primary and secondary diffractive optically variable effect generating structures such that:

the primary diffractive optically variable effect generating structure exhibits a primary optically variable effect at least at a first viewing angle in a direction of rotation about the second direction, and the secondary diffractive optically variable effect generating structure exhibits a secondary optically variable effect at least at a second viewing angle in the direction of rotation about the second direction, different from the first viewing angle in the direction of rotation about the second direction.

13. The security element according to claim 12, wherein the primary and secondary diffractive optically variable effect generating structures are respective diffraction gratings, and wherein grating elements of the diffraction gratings are oriented at an angle of at least 45° to the second direction.

14. The security element according to claim 12, wherein the primary and secondary diffractive optically variable effect generating structures are respective diffraction gratings, and wherein grating elements of the diffraction gratings are oriented at an angle of at least 70° to the second direction.

15. The security element according to claim 12, wherein the primary and secondary diffractive optically variable effect generating structures are respective diffraction gratings, and wherein grating elements of the diffraction gratings are oriented at an angle of at least 80° to the second direction.

16. The security element according to claim 12, wherein the primary diffractive optically variable effect generating structure is provided across the primary areas in accordance with a primary image, and wherein the secondary diffractive optically variable effect generating structure is provided across the secondary areas in accordance with a secondary image such that the primary and secondary images are visible at least at the first viewing angle in a direction of rotation about the second direction and at least at the second viewing angle in a direction of rotation about the second direction, respectively.

* * * * *